US005796601A

United States Patent [19]

Yamamoto

[11] Patent Number: 5,796,601
[45] Date of Patent: Aug. 18, 1998

[54] RECTIFIER CONTROL SYSTEM

[75] Inventor: Yuushin Yamamoto, Tokyo, Japan

[73] Assignee: Mitsubishi Denki Kabushiki Kaisha, Tokyo, Japan

[21] Appl. No.: 639,888

[22] Filed: Apr. 29, 1996

[30] Foreign Application Priority Data

Jun. 9, 1995 [JP] Japan .................... 7-143516
Jan. 9, 1996 [JP] Japan .................... 8-001722

[51] Int. Cl.$^6$ .................................. H02M 5/42
[52] U.S. Cl. .................. 363/84; 363/41; 363/69
[58] Field of Search ................... 363/65, 67, 69, 363/70, 84, 85, 37, 39, 40, 41, 95

[56] References Cited

U.S. PATENT DOCUMENTS 5,268,832  12/1993  Kandatsu .................. 363/95
5,381,328  1/1995   Umezawa et al. .......... 363/41

FOREIGN PATENT DOCUMENTS 4368436  12/1992  Japan .
538047   2/1993   Japan .

OTHER PUBLICATIONS

"Handotai Denryoku Henkan Kairo" (Semiconductor Power Conversion Circuit); Institute of Electrical Engineers of Japan; p. 179, Mar. 31, 1987.

Primary Examiner—Stuart N. Hecker
Assistant Examiner—Y. J. Han
Attorney, Agent, or Firm—Leydig, Voit & Mayer, Ltd.

[57] ABSTRACT

A rectifier control system with rectifiers connected in parallel operates constantly by ensuring balance between the rectifiers with respect to output voltage and current. The rectifiers apply a DC voltage to a single DC bus. Current detectors associated with the rectifiers detect the bus current flowing through the DC bus. Voltage control circuits associated with the rectifiers control the DC voltage to coincide with a voltage command value. Command value generating circuits associated with the rectifiers correct the voltage command value with a signal proportional to the detected bus current or a signal obtained by integrating or amplifying the bus current with an amplifier having a first order lag characteristic.

19 Claims, 32 Drawing Sheets

RECTIFIER CONTROL SYSTEM

BACKGROUND OF THE INVENTION

1. Field of the Invention

The present invention relates to a rectifier control system for operating in parallel a plurality of rectifiers connected to an AC power source for generating a DC voltage.

2. Description of Related Art

To better understand the background technique of the invention, description will first be directed to an item of related art by referring to FIG. 33 which is a circuit block diagram showing a rectifier parallel operation system known heretofore and disclosed, for example, in Japanese Unexamined Patent Application Publication No. 038047/1993 (JP-A-5-038047). Referring to the figure, AC power sources 1 and 3 are electrically connected to power converters 2 and 4, respectively, which are implemented essentially in an identical structure. More specifically, the power converter 2 is comprised of a rectifier 11 for converting an AC power supplied from the AC power source 1 into a DC power, an inverter 12 connected to the output of the rectifier 11 for converting the DC power outputted from the rectifier 11 into an AC power of a predetermined frequency, which power is then supplied to a load 5 connected to an AC bus 7, a voltage control circuit 13 for controlling the DC voltage outputted from the rectifier 11 and a command value generating circuit 16 for issuing a voltage command value to the voltage control circuit 13.

Similarly, the power converter 4 includes a rectifier 21, an inverter 22, a voltage control circuit 23 and a command value generating circuit 26 which serve essentially the same functions as those components of the power converter 2 mentioned above. The rectifiers 11 and 21 have respective outputs connected to a DC bus 6 for supplying DC power in parallel to the inverters 12 and 22, respectively, which in turn have respective outputs connected to the AC bus 7 for supplying in parallel an AC power to the load 5. The bus currents ID1 and ID2 flowing through the DC bus 6 are detected by current detectors 15 and 25, respectively, the detection outputs of which are supplied to the command value generating circuits 16 and 26, respectively.

FIG. 34 is a block diagram showing a circuit arrangement of the command value generating circuit 16 known heretofore. Referring to the figure, the command value generating circuit 16 is comprised of a voltage command value setting unit 101 for setting a voltage command value VD* and an adder-subtractor 102 for performing addition/subtraction for a value obtained by multiplying the bus current ID1 outputted from a current detector 15 by a predetermined value by means of the coefficient unit 103 and the voltage command value VD*. Similarly, the command value generating circuit 26 is constituted by a voltage command value setting unit 201, an adder-subtractor 202 and a coefficient unit 203 which serve essentially the same functions as the corresponding components of the command value generating circuit 16 mentioned above.

Now, the description will turn to parallel operation of the rectifiers of the conventional rectifier control system. By way of example, let's assume that a DC current IRD1 (where IRD1>0) flows from the rectifier 11 to the rectifier 21 by way of the DC bus 6. In that case, when the output voltage VD of the rectifier 11 is higher than the output voltage of the rectifier 21, the adder-subtractor 102 incorporated in the command value generating circuit 16 which is provided in association with the rectifier 11 subtracts a signal obtained by multiplying the bus current ID1 of the DC bus as detected by the current detector 15 by a factor or coefficient R by means of the coefficient unit 103 from the voltage command value VD* issued from the voltage command value setting unit 101. As a result of this, there can be obtained a voltage command value VD1* (=VD*−R×ID1) which is then supplied to the voltage control circuit 13.

The command value generating circuit 26 is also implemented in a same configuration as the command value generating circuit 16. Since a bus current ID2 (=−ID1<0) flows through the DC bus 6 as viewed from the side of the rectifier 21, a voltage command value VD2* (=VD*−R×ID2) determined arithmetically by the command value generating circuit 26 is supplied to the voltage control circuit 23. As a consequence, the voltage command value for the rectifier 11 is so corrected as to assume a smaller value while that for the rectifier 21 is so corrected as to assume a greater value. Furthermore, because the output voltages of the rectifiers 11 and 21 are controlled by the voltage control circuits 13 and 23, respectively, unbalance in the output voltages between the rectifiers 11 and 21 can be canceled out or eliminated.

FIG. 35 is an equivalent circuit diagram for illustrating the principle underlying the parallel operation of the rectifiers in the conventional system. A power supply source 11a is functionally equivalent to the rectifier 11 which generates a DC voltage V1 corresponding to a DC voltage generated by the rectifier 11 when it is operating solely or independently, while a power supply source 21a equivalently represents the rectifier 21 operating solely for generating a DC voltage V2 and corresponds to the equivalent power supply source 11a. The voltage command values for the rectifiers 11 and 21, respectively, are corrected in accordance with a current flowing through the DC bus 6, wherein control quantities for controlling the output voltages of the voltage control circuits 13 and 23 are in proportion to the bus currents ID1 and ID2, respectively, flowing through the DC bus 6, being corrected in accordance with the voltage command value.

For the reasons described above, the coefficient units 103 and 203 can be simulated as virtual resistors 103a and 203a, respectively. By way of example, let's assume that a difference ΔV (=V1−V2) between the DC voltages V1 and V2 which are outputted from the rectifiers 11 and 21, respectively, when they are operating in parallel, is one percent (1%) due to variance of the command value, nonuniformity of the control circuit, sensors and others. Then, the coefficient or factor of the coefficient unit is so set that each of the resistors 103a and 203a assumes a resistance value R=20% (i.e., resistance value bringing about a voltage drop corresponding to 20% of a rated DC voltage when a rated DC current flows). In that case, the current ID1 flowing through the DC bus can be given as follows:

$$ID1 = \Delta V/2R = 0.01/0.4 = 0.025$$

As can be seen from the foregoing, upon flowing of a current equal to 2.5% of the rated current, the voltage command value for the rectifiers 11 and 21 is so corrected that the output voltages are controlled by the voltage control circuits 13 and 23 in accordance with the corrected voltage command value, whereby an unbalanced state between the output voltages of the rectifiers 11 and 21 disappears under the control of the voltage control circuit 13, 23.

With the arrangement of the conventional rectifier control system described above, a current ID1 (=−ID2) will flow through the DC bus upon elimination of unbalance between the outputs of the rectifiers 11 and 21. This current ID1 represents a difference between the current IRD1* to be intrinsically generated by the rectifier and the current IRD1 actually outputted by the rectifier. Namely, ID1=IRD1*–IRD1. Accordingly, in order to eliminate unbalance not only in the output voltage between the rectifiers but also unbalance of the output current therebetween, it is required to increase the resistance values of the resistors 103a and 203a shown in FIG. 35 to thereby decrease the current ID1.

By way of example, in order to reduce the current ID1 flowing through the DC bus to a value not greater than 1% when the voltage difference ΔV is 50%, the coefficient R of the coefficient unit 103 is determined as follows:

$$R=\Delta V/2ID1=0.05/0.02=2.5$$

Thus, the coefficients of the coefficient units incorporated in the command value generating circuits 16 and 26, respectively, have to be set so that each of the resistors 103a and 203a shown in FIG. 35 can assume the resistance value R=250%.

As is apparent from the foregoing description, in the case of the conventional rectifier control system known heretofore, it is necessary to increase the resistance values of the virtual resistance 103a and 203a, respectively, in order to suppress the unbalance between the output currents of the rectifiers when the voltage difference ΔV between the DC voltages of the rectifiers operating independent of each other is large.

In this conjunction, it is however noted that the voltage control response speed of the rectifier is intrinsically subject to limitation. Some elements in the control circuits for the rectifiers operate with delays or time lags. Accordingly, an upper limit is naturally imposed to the resistance values of the virtual resistors 103a and 203a which are to serve for ensuring stable operation of the rectifiers. In this way, the conventional rectifier control system suffers a problem that the unbalance or difference between the output currents of the rectifiers can not be suppressed so that it becomes smaller than a desired value when the voltage difference ΔV is large.

Additionally, it is noted that although the virtual resistors 103a and 203a operate as resistors when the frequency is lower than a response frequency of the voltage control system, the resistance values of the virtual resistors 103a and 203a decrease as the frequency increases beyond the frequency to which the voltage control system can respond. Thus, the conventional rectifier control system suffers a problem that operation of the virtual resistors can not transiently be expected and thus the unbalance between the output currents of the rectifiers can not be suppressed within a range of response of the voltage control system.

SUMMARY OF THE INVENTION

In the light of the state of the art described above, it is an object of the present invention to provide a rectifier control system which allows a plurality of rectifiers to operate stably in parallel by ensuring balance between the rectifiers in respect to the output voltage and the output current while suppressing unbalance between the output currents of the rectifiers even in the transient state, to thereby solve the problems of the conventional rectifier control system discussed above.

In view of the above and other objects which will become apparent as the description proceeds, there is provided according to an aspect of the present invention a rectifier control system which includes a plurality of rectifiers arranged to operate in parallel while applying a DC voltage to a single direct current bus, current detectors provided each in association with each of the rectifiers for detecting a bus current flowing through the direct current bus, voltage control circuits provided each in association with each of the rectifiers for controlling the DC voltage so as to make the DC Voltage coincide with a voltage command value, and command value generating circuits each provided in association with each of the rectifiers for correcting the voltage command value by a signal obtained by amplifying the bus current detected by the current detector by means of an amplifier having a low-frequency range limiting characteristic.

In a preferred mode for carrying out the invention, the command value generating circuit may include a limiter circuit for allowing an output of positive polarity from the amplifier to pass therethrough while limiting output of negative polarity of the amplifier to zero.

In another preferred mode for carrying out the invention, the command value generating circuit may include a limiter circuit for allowing an output of negative polarity from the amplifier to pass therethrough while limiting output of positive polarity of the amplifier to zero.

In yet another preferred mode for carrying out the invention, the command value generating circuit may include a dead zone circuit for suppressing influence of an offset of the bus current detected by the current detector, and an amplifier for integrating and amplifying a signal passed through the dead zone circuit for thereby correcting the voltage command value by the amplified signal outputted from the amplifier.

In still another preferred mode for carrying out the invention, the command value generating circuit may include a limiter circuit for passing therethrough a signal component of negative polarity of the signal outputted from the integrating amplifier while limiting to zero a signal component of positive polarity outputted from the integrating amplifier.

Further provided according to another aspect of the invention is a rectifier control system which includes a plurality of rectifiers arranged to operate in parallel while applying a DC voltage to a single direct current bus, current detectors provided each in association with each of the rectifiers for detecting a bus current flowing through the direct current bus, voltage control circuits provided each in association with each of the rectifiers for controlling the DC voltage so as to make it coincide with a voltage command value, and a command value generating circuit for correcting the voltage command value with a signal obtained by integrating a signal which is in proportion to a deviation between the bus current detected by the current detector and the current command value.

In a further preferred mode for carrying out the invention, the command value generating circuit may include a limiter circuit for passing there through a signal component of negative polarity of the integrated signal while limiting to zero a signal component of positive polarity of the integrated signal.

In yet further preferred mode for carrying out the invention, the command value generating circuit may be so arranged as to correct the voltage command value with a signal which is obtained through proportional integration by multiplying a signal which is proportional to a deviation between the bus current detected by the current detector and the current command value by a predetermined coefficient and by integrating the signal resulting from the multiplication.

In still further preferred mode for carrying out the invention, the command value generating circuit may include a limiter circuit for passing there through a signal component of negative polarity of the proportionally integrated signal while limiting to zero a signal component of positive polarity of the integrated signal.

In a further preferred mode for carrying out the invention, the command value generating circuit may include a lower limit value restricting circuit setting for a permissible value of DC voltage for the voltage command value or for a signal for correcting the voltage command value.

In yet further preferred mode for carrying out the invention, the command value generating circuit may include an upper limit value restricting circuit setting for a permissible value of DC voltage for the voltage command value or for a signal for correcting the voltage command value.

According to yet another aspect of the present invention, there is provided a rectifier control system which includes a plurality of thyristor rectifiers arranged to operate in parallel while applying a DC voltage to a single direct current bus, current detectors provided each in association with each of the thyristor rectifiers for detecting a bus current flowing through the direct current bus, voltage control amplifiers provided each in association with each of the thyristor rectifiers for outputting a phase-control angle signal for making the DC voltage coincide with a voltage command value, and α-command correcting circuits each provided in association with each of the thyristor rectifiers for correcting the phase-control angle signal with a signal proportional to a bus current detected by the current detector.

In still further preferred mode for carrying out the invention, the α-command correcting circuit may determine a correcting quantity for the phase-control angle on the basis of the bus current.

For carrying out the invention, the command correcting circuit may determine a correcting quantity signal for correcting the phase-control angle on the basis of an effective value of an AC power supply, a phase-control angle and the bus current.

Further, the command correcting circuit may include a low-pass filter for eliminating a high harmonic component contained in the correcting quantity signal of the phase-control angle.

Furthermore, the command value generating circuit may be so arranged as to correct a voltage command value to be supplied to the voltage control amplifier with a signal proportional to the bus current and a signal obtained by amplifying a signal indicative of the bus current by means of an amplifier having a low frequency range limiting characteristic.

The α-command correcting means may be so arranged as to correct the phase-control angle and the voltage command value by a signal obtained by amplifying the bus current detected by the current detector by means of an amplifier having a low frequency range limiting characteristic.

According to a further aspect of the present invention, there is provided a rectifier control system which includes a plurality of thyristor rectifier circuits arranged to operate in parallel for applying a DC voltage to a single direct current bus, current detectors provided each in association with each of the thyristor rectifier circuits for detecting a bus current flowing through the direct current bus, voltage control amplifiers provided each in association with each of the thyristor rectifier circuits for outputting a current command value signal for making the DC voltage coincide with a voltage command value, a current control amplifier for allowing the current command value to coincide with output current of each of the thyristor rectifier circuits, and a command value correcting means each provided in association with each of the thyristor rectifier circuits for correcting the voltage command value and the current command value by a signal obtained by amplifying the bus current outputted from the current detector by means of an amplifier having a low-frequency range limiting characteristic.

According to yet further aspect of the present invention, there is provided a rectifier control system which includes a plurality of thyristor rectifier circuits arranged to operate in parallel while applying a DC voltage to a single direct current bus, current detectors provided each in association with each of the thyristor rectifier circuits for detecting a bus current flowing through the direct current bus, voltage control amplifiers each provided in association with each of the thyristor rectifier circuits for outputting a thyristor rectifier main circuit output voltage command value for making the DC voltage coincide with a voltage command value, a voltage control circuit for causing the thyristor rectifier main circuit output voltage command value to coincide with the thyristor rectifier main circuit output voltage of each of the thyristor rectifier circuits, and a command value correcting means each provided in association with each of the thyristor rectifier circuits for correcting the voltage command value, the thyristor rectifier main circuit output voltage command value and the current command value with a signal which is in proportion to the bus current detected by the current detector and a signal which is obtained by amplifying the bus current by means of an amplifier having a low-frequency range limiting characteristic.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
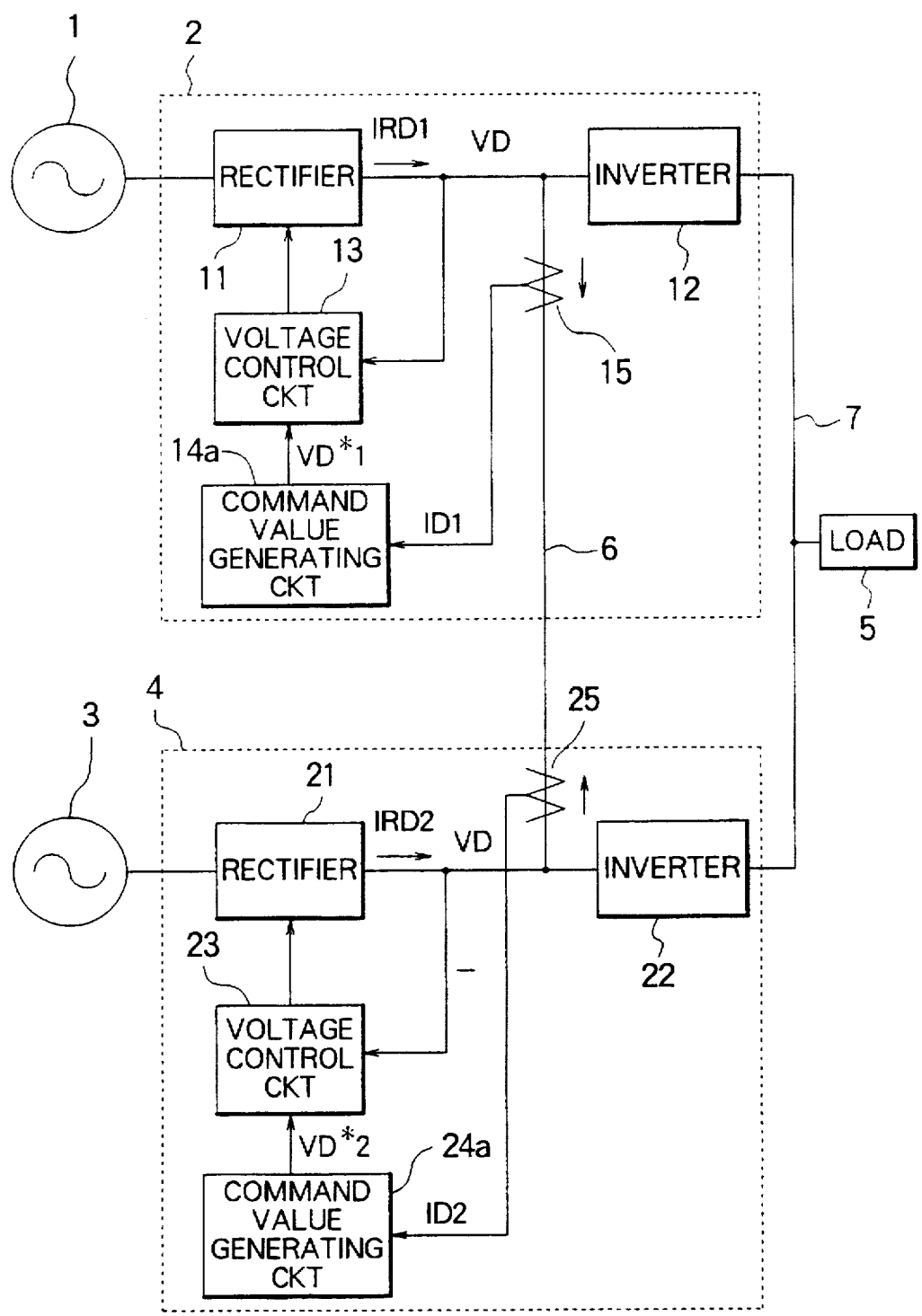
FIG. 1 is a circuit diagram showing a configuration of a rectifier control system according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 2:
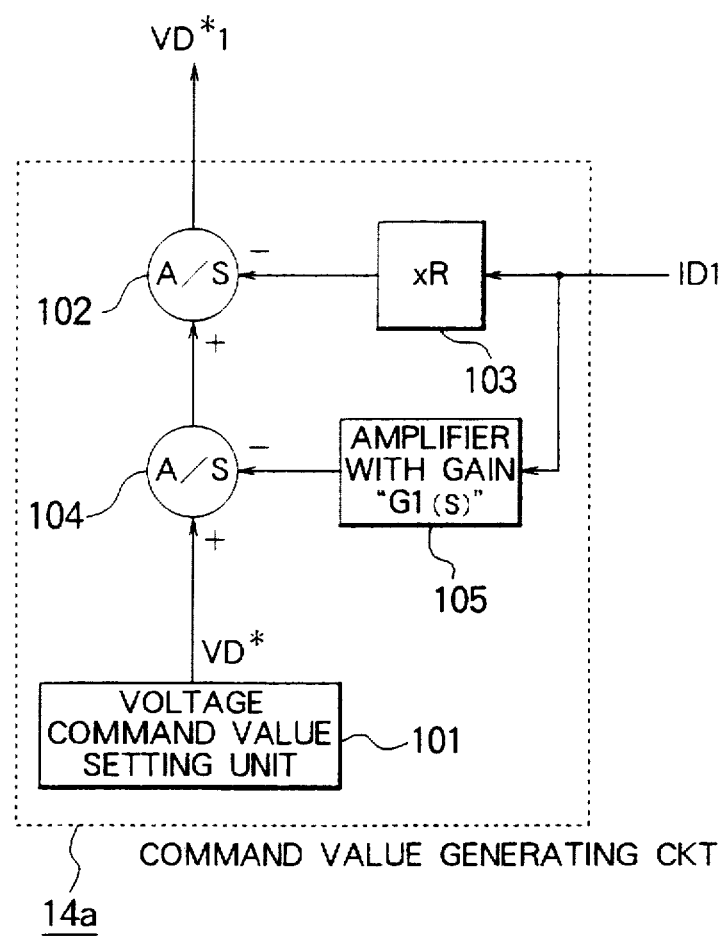
FIG. 2 is a block diagram showing a circuit configuration of a command value generating circuit according to the first embodiment of the invention.
Figure 33:
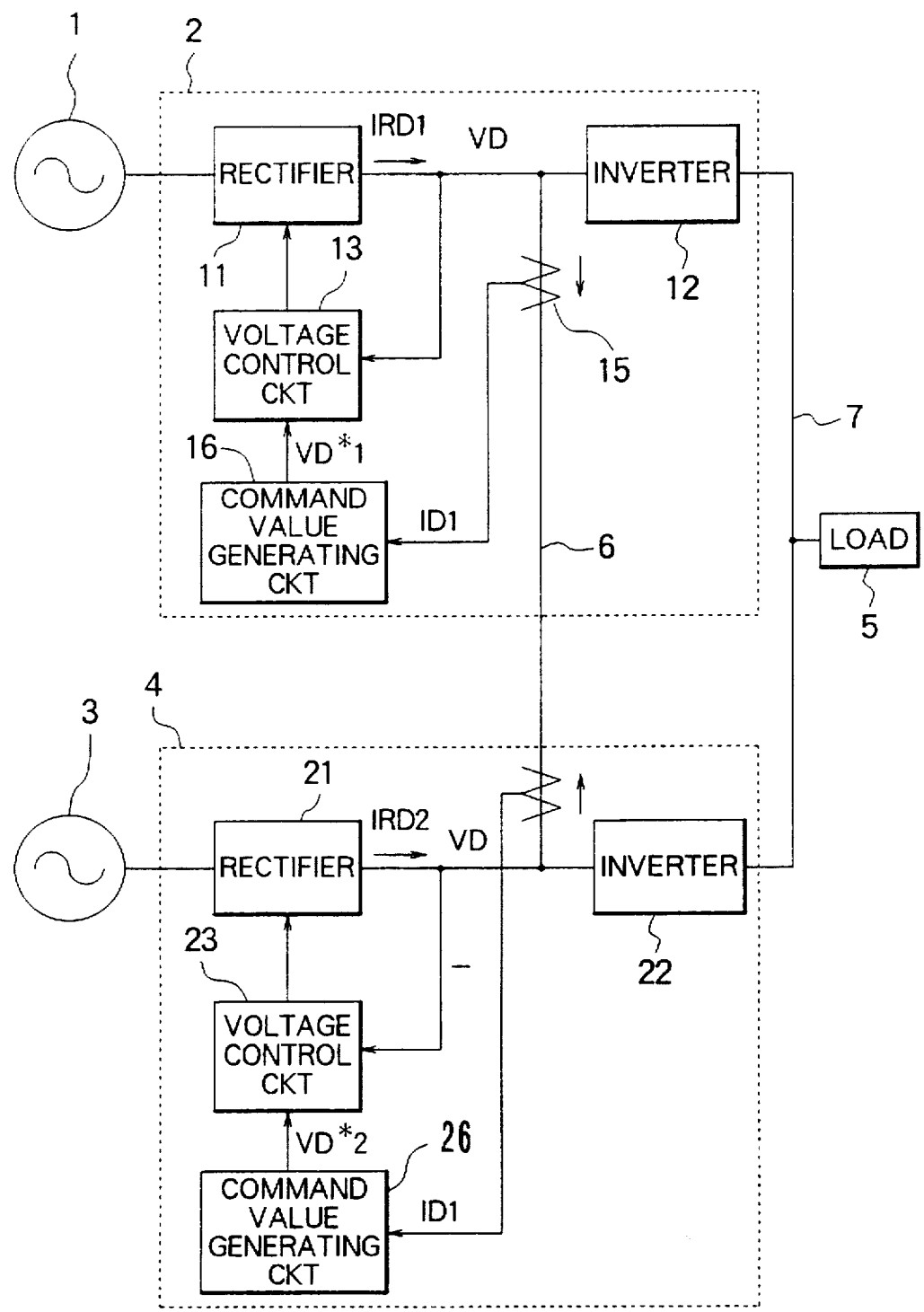
FIG. 33 is a circuit block diagram showing a rectifier parallel operation system of the related art.
Figure 34:
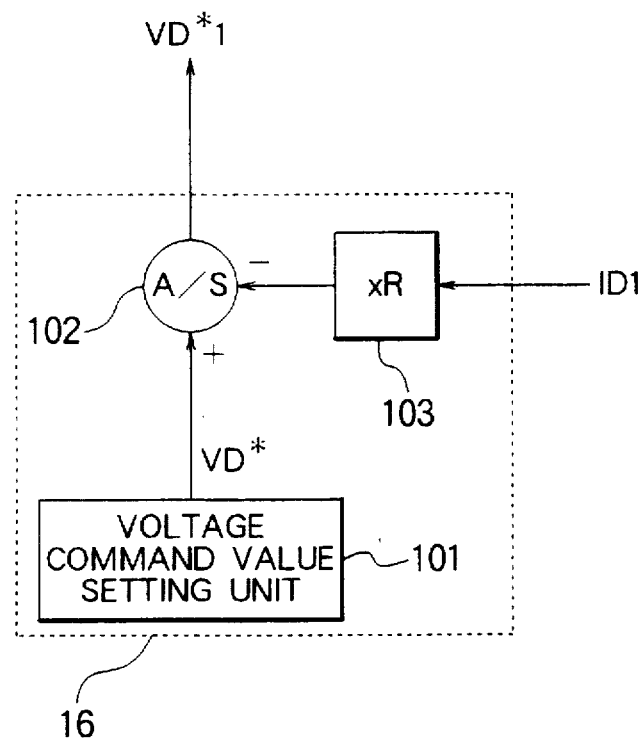
FIG. 34 is a block diagram showing a circuit arrangement of a command value generating circuit of the related art.
Figure 35:
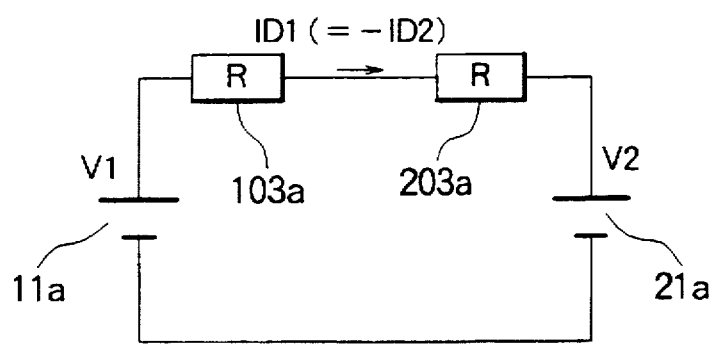
FIG. 35 is a schematic circuit diagram for illustrating the principle underlying the parallel operation of the rectifiers in the related art.

A first embodiment of the rectifier control system according to the present invention will be described by reference to FIG. 1 which is a circuit diagram showing the rectifier control system according to the instant embodiment and in which same elements appearing in both FIGS. 1 and 33 bear the reference symbols. The rectifier control system according to the first embodiment of the invention differs from the conventional one with respect to the arrangement of the command value generating circuits 14a and 24a each of which is adapted to issue a signal representing a voltage command value to the voltage control circuits 13 and 23 designed to control the DC voltage applied to the rectifier 11, 21. FIG. 2 shows a block diagram of a circuit configuration of the command value generating circuit 14a, wherein reference numerals 101, 102 and 103 are used for denoting the same components as those shown in FIG. 34. Thus, repeated description of these components will be unnecessary. In the command value generating circuit 14a implemented in the configuration shown in FIG. 2, a signal obtained by amplifying the bus current ID1 which is detected by the current detector 15 by an amplifier 105 having a first order lag characteristic G1(s) is subtracted from a voltage command value VD* outputted from the voltage command value setting unit 101 by means of an adder-subtractor 104. Further, a signal obtained by multiplying the bus current ID1 by a coefficient (or a predetermined constant) R by means of a coefficient unit 103 is subtracted from the output of the adder-subtractor 104 by an adder-subtractor 102 to thereby derive a voltage command value VD*1 for the voltage control circuit 13. Incidentally, a command value generating circuit 24a is also implemented substantially in a same configuration as that of the command value generating circuit 14a.

Figure 3:
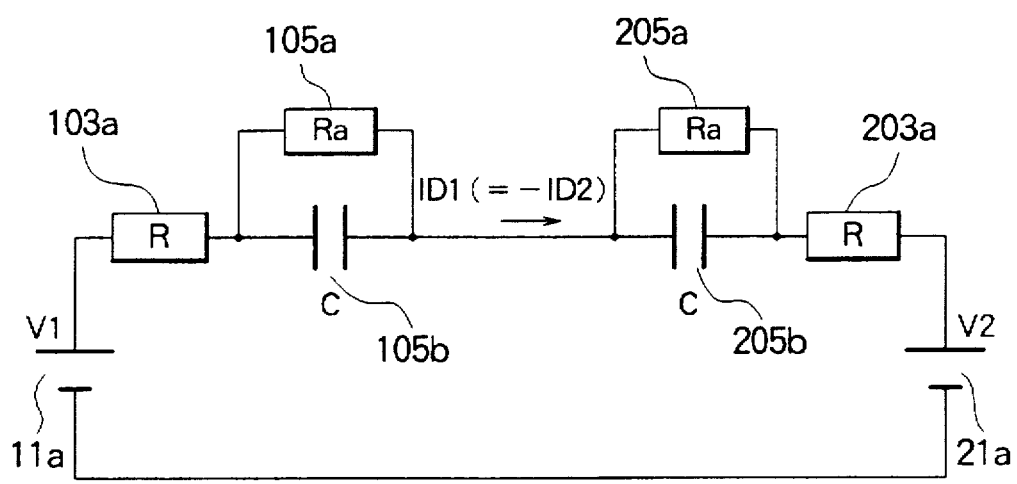
FIG. 3 is a schematic equivalent circuit diagram for illustrating the principle of parallel operation of rectifiers according to the first embodiment of the invention.

Next, operation of the rectifier control system according to the instant embodiment of the invention will be described by reference to FIG. 3 which is a schematic circuit diagram for illustrating the principle of parallel operation of the rectifiers 11 and 21. Referring to FIG. 3, a DC voltage V1 equivalent to the DC voltage generated upon independent operation of the rectifier 11 is represented by a DC voltage source 11a, while a DC voltage V2 equivalent to a DC voltage generated upon independent operation of the rectifier 21 is represented as a DC voltage source 21a. As is shown in FIG. 3, the DC voltage sources 11a (V1) and 21a (V2) have respective negative or minus poles which are connected in common, wherein a virtual resistor 103a simulating operation of the coefficient unit 103 which serves for correcting the voltage command value in proportional dependence on the current flowing through a DC bus 6 from the positive pole of the DC voltage source 11a (V1) to the DC voltage source 21a (V2), a virtual capacitor 105b having a capacitance value C to which the virtual resistor 105a having a resistance value Ra is connected in parallel, a virtual capacitor 205b having a capacitance value C to which a virtual resistor 205a having a resistance value Ra is connected in parallel, and a virtual resistor 203a which simulates operation of a coefficient unit 203 for correcting the voltage command value in proportion to the current flowing through the DC bus 6 are connected in series to one another.

At this juncture, it should be noted that the combination of the virtual resistor 105a and the virtual capacitor 105b is to simulate the operation of the amplifier 105 which has a first order lag characteristic. On the other hand, the combination of the virtual resistor 205a and the virtual capacitor 205b is to simulate the operation of an amplifier which is equivalent to an amplifier 205 incorporated in the control circuit for the rectifier 21. For the reason which will be mentioned later on, the resistance value Ra is selected to be sufficiently greater than the resistance value R. When the rectifiers 11 and 21 are operated in parallel in the state where a voltage difference $\Delta V$ (=V1−V2) appears between the direct voltage sources 11a and 21a, the bus current ID1 is limited by the virtual resistors 103a and 203a and given by the following expression:

$$ID1 = \Delta V / 2R$$

With a time constant T (=RC=2R×C/2) determined by a serial resistance value 2R of the virtual resistors 103a and 203a and a serial capacitance value C/2 of the virtual capacitors 105b and 205b, each of the virtual capacitors 105b and 205b is charged to a voltage corresponding to a half of the voltage difference $\Delta V$, which results in that the voltages applied to the virtual resistors 103a and 203a become substantially zero, whereby the bus current ID1 is caused to decrease approximately to zero.

When a current which is allowed to flow through the DC bus 6 transiently for a maximum output voltage difference $\Delta V$max (e.g. 5%) expected to appear when the rectifiers 11 and 21 are operated as a parallel operation system is represented by IDmax (e.g. 5%), the resistance value R may be set or selected as follows:

$$R = \Delta V\text{max}/2ID\text{max} \ (=0.05/0.1=0.5=50\%)$$

Furthermore, by selecting the capacitance value C such that the time constant T exceeds or becomes greater than the voltage control response speed of the rectifiers 11 and 21 to thereby allow the voltage command value correcting operation to be performed at a speed slower than the voltage control response rate or speed, operation of the rectifiers 11 and 21 can be stabilized. The functions of the virtual capacitors 105b and 205b can be realized through exact integration of the currents detected by the current detectors 15 and 25, respectively. In this conjunction, it is however noted that when both the current detectors 15 and 25 suffer an offset error in the positive direction with the voltage difference $\Delta V$ being zero (i.e., V1=V2), the virtual capacitors 105b and 205b perform the integrating operation in the direction in which the voltage command value is decreased, respectively. As a consequence, the voltage command value drops steeply notwithstanding of the fact that the voltage difference $\Delta V$ is zero.

Under the circumstances, the virtual resistors 105a and 205a are put into operation together with the virtual capacitors 105b and 205b, and additionally the currents detected by the current detectors 15 and 25 are not integrated exactly but imparted with a first order lag characteristic, to thereby restrict the gain in the low-frequency region to a value Ra. By way of example, let's assume that the current detection offset error Io is 0.1% and that a voltage command value correcting quantity Vo due to the current detection offset error is to be so reduced as not to exceed 1%, the resistance value Ra may be set as follows:

$$Ra = Vo/Io (=0.01/0.001=10=1000\%)$$

As can be seen from the above expression, the resistance value Ra is substantially greater than the resistance value R.

Thus, in the command value generating circuit 14a for the rectifier 11, a signal obtained by amplifying the signal representative of the bus current ID1 detected by the current detector 15 by means of the amplifier 105 having the first order lag characteristic G1(s) is subtracted from the voltage command value VD* outputted from the voltage command value setting unit 101 by the adder-subtractor 104. A signal obtained by multiplying the bus current ID1 by the coefficient R by means of the coefficient unit 103 is subtracted from the output of the adder-subtractor 104 by the adder-subtractor 102. Thus, the voltage command value VD*1 given by the following expression is supplied to the voltage control circuit 13. Namely, $$VD*1 = VD* - G1(s) \times ID1 - R \times ID1$$

The command value generating circuit 24a for the rectifier 21 is implemented in a structure similar to that of the command value generating circuit 14a. Consequently, the voltage command value for the rectifiers 11 and 21 is corrected by a signal having a magnitude which is in proportion to the current flowing through the DC bus 6 and which is amplified by the amplifier with the first order lag characteristic. The output voltages of the rectifiers 11 and 21 are controlled by the voltage control circuits 13 and 23, respectively, on the basis of the corrected value mentioned above. In this manner, unbalance between the rectifiers 11 and 21 with respect to the output voltage and the output current can be suppressed, whereby stable parallel operation of the rectifiers 11 and 21 can be carried out. Besides, influence exerted to the correction of the voltage command value by the offset errors of the current detectors can be suppressed to a minimum.

Embodiment 2

Figure 4:
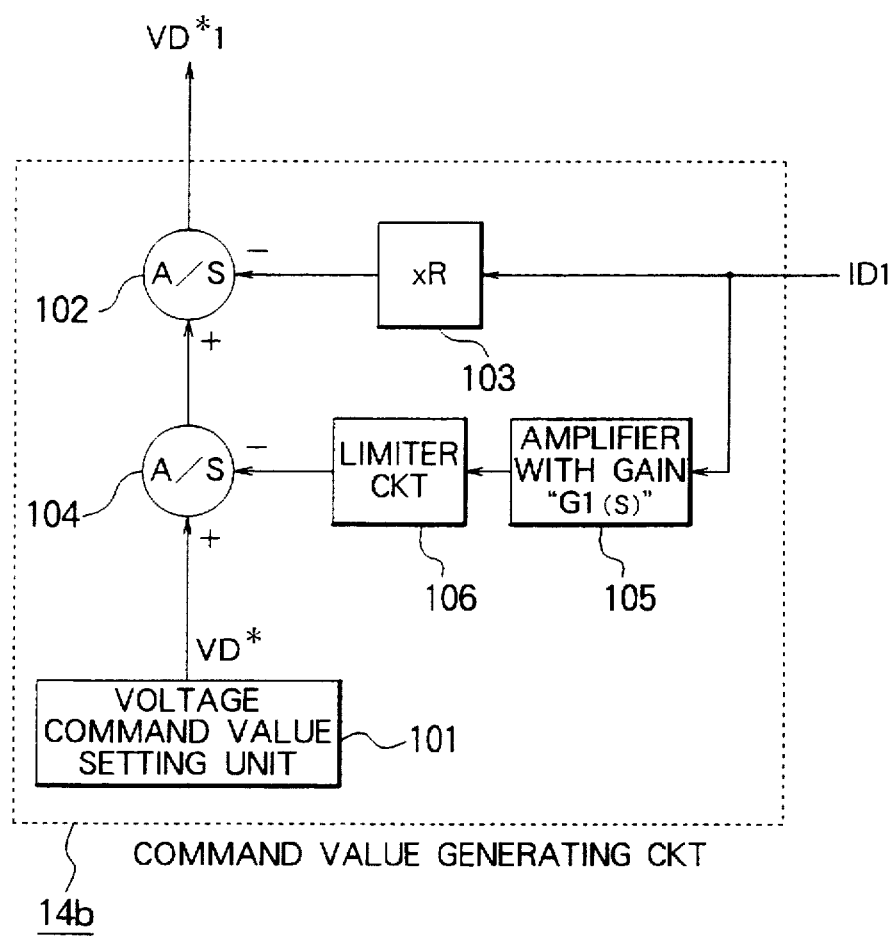
FIG. 4 is a block diagram showing a circuit configuration of a command value generating circuit according to a second embodiment of the present invention.

In the case of the rectifier control system according to the first embodiment of the invention, the voltage appearing on the DC bus 6 upon parallel operation of both rectifiers (11, 21) is substantially equal to an average value of the DC voltage generated by either one of the rectifiers (i.e., 11 or 21) operating independently. In the case of the rectifier control system according to a second embodiment of the invention, a limiter circuit 106 is incorporated in the command value generating circuit 14b in such a manner as illustrated in FIG. 4 so that the output of the amplifier 105 exhibiting the first order lag characteristic G1(s) is effective only in the positive direction. As a result of this, the voltage appearing across the DC bus 6 can be set approximately to a minimum value of the DC voltage generated when the rectifiers for parallel operation is operated independently.

Figure 5:
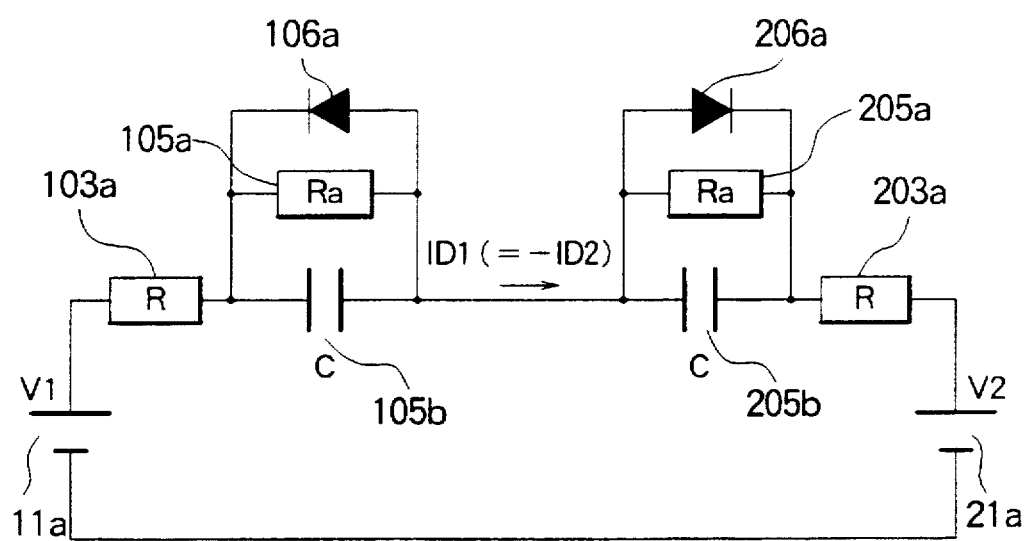
FIG. 5 is an equivalent circuit diagram for illustrating the principle of parallel operation of the rectifiers in the rectifier control system according to the second embodiment of the invention.

FIG. 5 is a schematic equivalent circuit diagram for illustrating the principle of the parallel operation of the rectifiers 11 and 21 in the rectifier control system according to the second embodiment of the present invention. Referring to FIG. 5, by connecting a virtual diode 106a in parallel to a virtual resistor 105a and a virtual capacitor 105b, the virtual capacitor 105b is charged only when the bus current ID1 is of positive polarity, bringing about a voltage drop which is effective for causing the voltage command value to drops steeply. In other words, the virtual capacitors 105b and 205b can operate only in the direction to lower steeply the voltage command value due to the presence of the virtual diodes 106a and 206a. Consequently, the voltage on the DC bus 6 assumes substantially a minimum value of the DC voltage generated when the rectifier 11 or 21 operates independently or solely. The function of the virtual diode 106a can be realized by providing a limiter circuit 106 which allows an input current of positive polarity to pass therethrough, while suppressing any input current of negative polarity to zero.

As is apparent from the above description, in the command value generating circuit 14b of the rectifier control system according to the instant embodiment of the invention, the signal obtained by amplifying the bus current ID1 detected by the current detector 15 by means of the amplifier 105 with a first order lag characteristic G1(s) is caused to flow through the limiter circuit 106 which is designed to allow the input of positive polarity to pass therethrough while suppressing the input of negative polarity to zero is subtracted from the voltage command value VD* outputted from the voltage command value setting unit 101 by the adder-subtractor 104. In addition, by subtracting from the output of the adder-subtractor 104 a value which is obtained by multiplying the bus current ID1 by the coefficient (or a predetermined constant) R through the coefficient unit 103 by means of the adder-subtractor 102, the voltage command value VD*1 for the voltage control circuit 13 which is given by the following expression can be obtained.

$$VD*1=VD*-G1(s)\times ID1-R\times ID1$$

Further, a command value generating circuit 24b for the rectifier 21 (not shown) is implemented in a configuration substantially identical with that of the command value generating circuit 14b. Accordingly, the voltage command value for the voltage control circuits 13, 23 is corrected not only by a signal which is in proportional relation to the bus current ID1 flowing through the DC bus 6 but also by a signal of positive polarity amplified by the amplifier having the first order lag characteristic. The output voltages of the rectifiers 11 and 21 are controlled by the voltage control circuits 13 and 23, respectively.

In this way, the output voltages of the rectifiers 11 and 21 are balanced with each other substantially at the minimum values of the DC voltages generated by the rectifiers 11 and 21, respectively, and designed for parallel operation, when they are operated independent of each other. Thus, unbalance in the output current can satisfactorily be suppressed, whereby the parallel operation of the rectifiers 11 and 21 can be carried out in a satisfactorily stabilized state. Besides, influence of the offset errors of the current detectors 15 and 25 as exerted to the correction of the voltage command value can be suppressed to a minimum.

Embodiment 3

Figure 6:
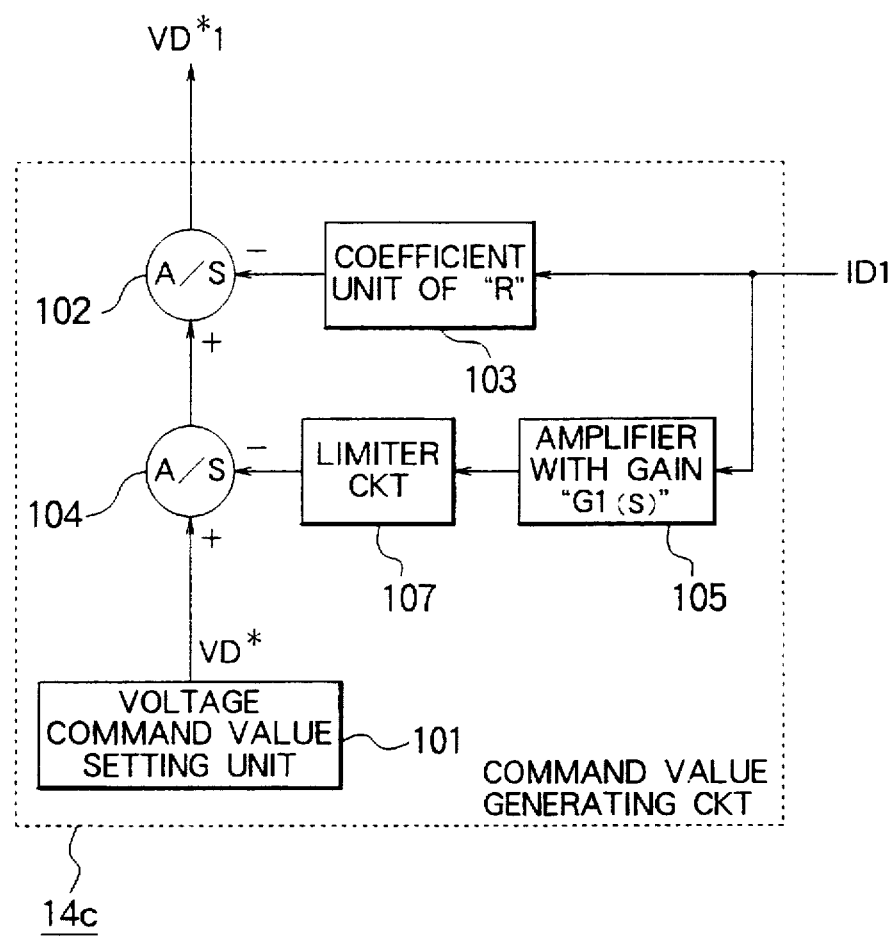
FIG. 6 is a block diagram showing a circuit structure of a command value generating circuit according to a third embodiment of the present invention.

In the case of the rectifier control system according to the first embodiment of the invention, the voltage appearing on the DC bus 6 upon parallel operation of both rectifiers (11, 21) is substantially equal to an average value of the DC voltage generated by either one of the rectifiers (i.e., 11 or 21) operating independently. In the case of the rectifier control system according to a third embodiment of the invention, a limiter circuit 107 is incorporated in the command value generating circuit 14c in such a manner as illustrated in FIG. 6 so that the output of the amplifier 105 exhibiting the first order lag characteristic G1(s) is effective only in the negative direction. As a result of this, the voltage of the DC bus 6 can be set approximately to a maximum value of the DC voltage generated when the rectifiers for parallel operation is operated independently.

Figure 7:
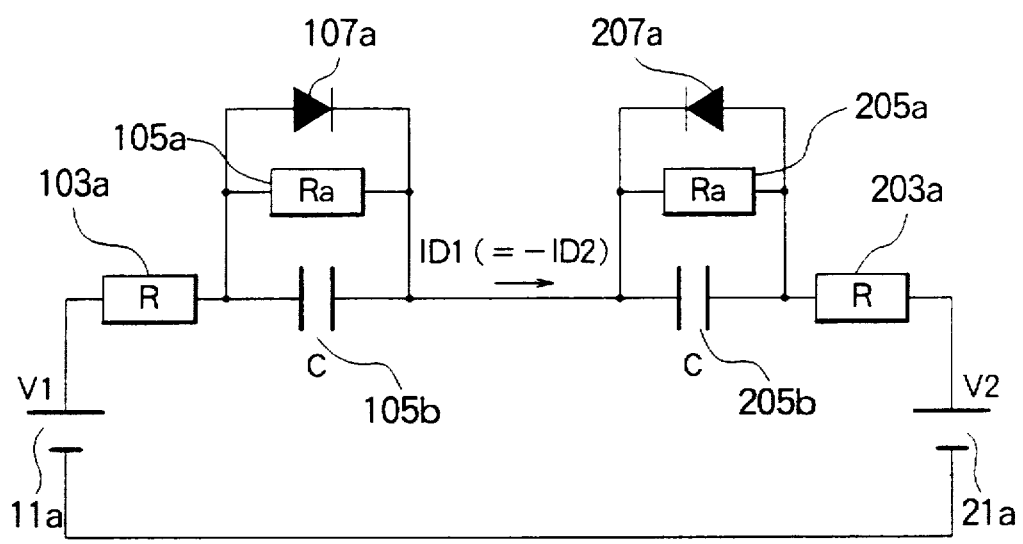
FIG. 7 is an equivalent circuit diagram for illustrating the principle of parallel operation of the rectifiers in the rectifier control system according to the third embodiment of the invention.

FIG. 7 is a schematic equivalent circuit diagram for illustrating the principle of the parallel operation of the rectifiers 11 and 21 in the rectifier control system according to the third embodiment of the invention. Referring to FIG. 7, by connecting the virtual diode 107a in parallel to the virtual resistor 105a and a virtual capacitor 105b, the virtual capacitor 105b is charged only when the bus current ID1 is of negative polarity, bringing about a voltage increase which is effective for causing the voltage command value to increase. In other words, the virtual capacitors 105b and 205b can operate only in the direction to raise up the voltage command value due to the presence of the virtual diodes 107a and 207a. Consequently, the voltage on the DC bus 6 assumes substantially a maximum value of the DC voltage generated when the rectifier 11 or 21 operates independently or solely. The function of the virtual diode 107a can be realized by providing a limiter circuit 107 which allows a current of negative polarity to pass therethrough while suppressing to zero any input current of positive polarity.

Thus, in the command value generating circuit 14c for the rectifier 11, a signal is obtained by amplifying the signal representative of the bus current ID1 detected by the current detector 15 by means of the amplifier 105 having the first order lag characteristic G1(s), whereupon the output of the amplifier 105 is subtracted from the voltage command value VD* outputted from the voltage command value setting unit 101 by the adder-subtractor 104 after having passed through the limiter circuit 107 which allows only the input of negative polarity to pass while inhibiting the positive input signal. In addition, by subtracting from the output of the adder-subtractor 104 a value obtained by multiplying the bus current ID1 by the coefficient R by means of the adder-subtractor 102, the voltage command value VD*1 for the voltage control circuit 13 which is given by the following expression can be obtained.

$$VD*1=VD*-G1(s)\times ID1-R\times ID1$$

Further, a command value generating circuit 24c for the rectifier 21 (not shown) is implemented in a configuration substantially identical with that of the command value generating circuit 14c. Accordingly, the voltage command value for the rectifiers 11, 21 is corrected not only by a signal which bears a proportional relation to the current flowing through the DC bus 6 but also by the signal of negative polarity amplified by the amplifier having the first order lag characteristic. The output voltages of the rectifiers 11 and 21 are controlled by the voltage control circuits 13 and 23, respectively. In this way, the output voltages of the rectifiers 11 and 21 are balanced with each other substantially at the maximum values of the DC voltages generated by the rectifiers 11 and 21 designed for parallel operation when they are operated independent of each other. Thus, unbalance in the output current between the rectifiers can satisfactorily be suppressed, whereby the parallel operation of the rectifiers 11 and 21 can be carried out in a highly stabilized state. Besides, influence of the offset errors of the current detectors 15 and 25 as exerted to the correction of the voltage command value can be suppressed to a minimum.

Embodiment 4

Figure 8:
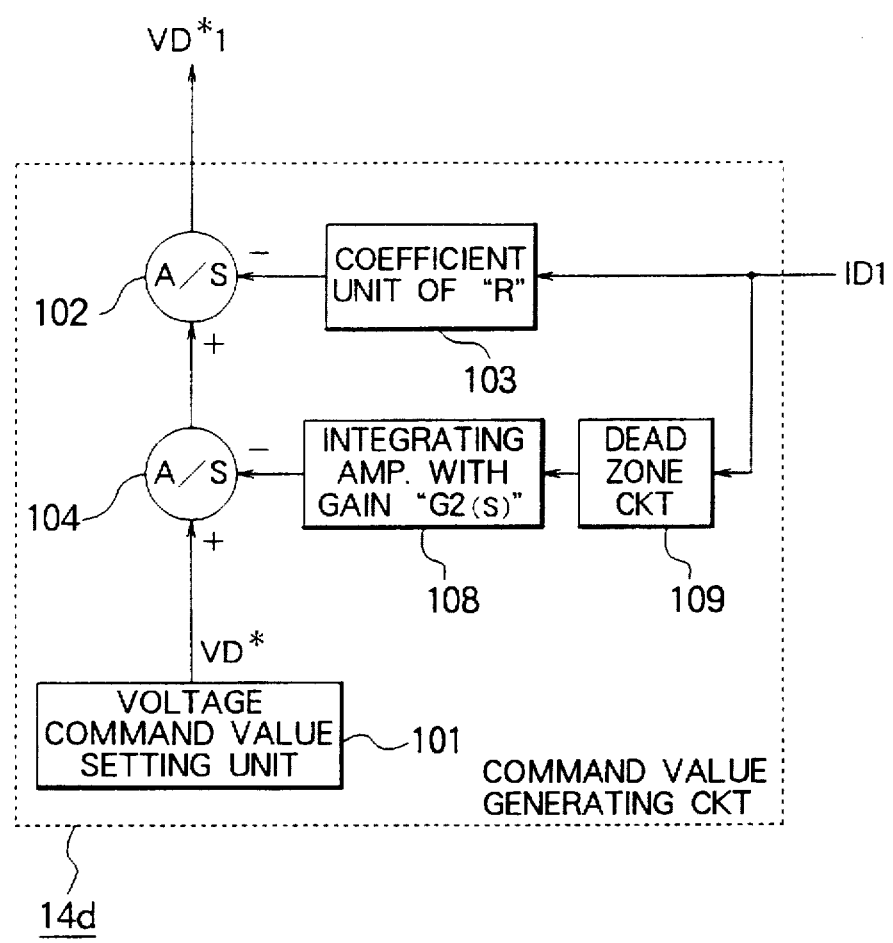
FIG. 8 is a block diagram showing a circuit structure of a command value generating circuit according to a fourth embodiment of the present invention.

In the case of the rectifier control system according to the first embodiment of the invention, a first order lag characteristic is given to the amplifier 105 which should intrinsically be imparted with an integration characteristic with a view to suppressing the influence of the offset errors of the current detectors 15 and 25 exerted to the correction of the voltage command value. However, instead of adopting such arrangement, a dead zone circuit 109 may be provided for limiting the bus current ID1 to zero in the vicinity of the offset level to thereby suppress or eliminate the above-mentioned influence of the offset error while providing an integrating amplifier 108 exhibiting an integration characteristic G2(s), to thereby mitigate the influence of the offset error exerted to the correction of the voltage command value, as in the case of the command value generating circuit 14d shown in FIG. 8.

Figure 9:
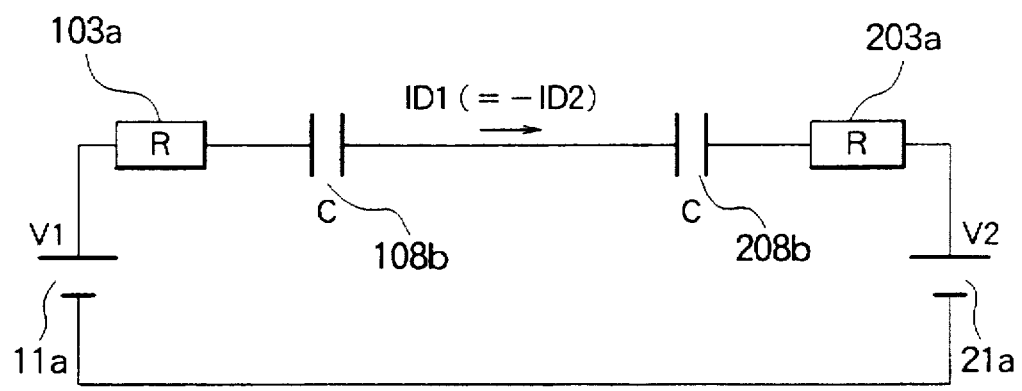
FIG. 9 is an equivalent circuit diagram for illustrating the principle of parallel operation of the rectifiers in the rectifier control system according to the third embodiment of the invention.

FIG. 9 is a schematic equivalent circuit diagram for illustrating the principle of the parallel operation of the rectifiers 11 and 21 in the rectifier control system according to the fourth embodiment of the present invention. Referring to FIG. 9, virtual capacitors 108a and 208a are connected in series to virtual resistors 103a and 203a. When the rectifiers 11 and 21 are operated in parallel in the case where a voltage difference $\Delta V$ (=V1-V2) exists between DC voltage sources 11a and 21a, the bus current ID1 is limited by the virtual resistors 103a and 203a and given by the following expression.

$$ID1 = \Delta V / 2R$$

Next, with a time constant T (=RC=2R×C/2) determined by a serial resistance value 2R of the virtual resistors 103a and 203a and a serial capacitance value C/2 of the virtual capacitors 108a and 208a, each of the virtual capacitors 108a and 208a is charged to a voltage corresponding to a half of a voltage difference $\Delta V$, which results in the voltages applied to the virtual resistors 103a and 203a being substantially zero, whereby the bus current ID1 decrease to approximately to zero.

The functions of the virtual capacitors 108a and 208a can be realized through exact integration of the currents detected by the current detectors 15 and 25, respectively. At this point, it is however noted that when both the current detectors 15 and 25 suffer an offset error in the positive direction with the voltage difference $\Delta V$ being zero (i.e., V1=V2), the virtual capacitors 108a and 208a perform the integrating operation in the direction in which the voltage command value is decreased, respectively, if the signal with an offset error is integrated as it is. As a consequence, the voltage command value drops notwithstanding the fact that the voltage difference $\Delta V$ is zero. Accordingly, a dead zone circuit 109 may be designed as follows.

$$y = x - |Iomax|(x \geq |Iomax|)$$

$$y = 0 (-|Iomax| < x < |Iomax|)$$

$$y = x + |Iomax|(x \leq -|Iomax|)$$

where Iomax represents a maximum value of an expected offset difference.

x represents an input of the dead zone circuit 109, and y represents an output of the dead zone circuit 109.

By inputting the output of the current detector 15 to the dead zone circuit 109, it is possible to input only the output signal whose absolute value is not smaller than the value |Iomax|. Besides, the voltage command value is corrected through the integration control until the absolute value of the output of the current detector 15 becomes equal to or smaller than the value |Iomax|. When the absolute value of the output of the current detector 15 becomes equal to or smaller than the value |Iomax|, the integration control comes to an end in appearance, whereby the voltage command value is protected from unnecessary or extraneous correction.

As is apparent from the above description, in the command value generating circuit 14d for the rectifier 11, the signal obtained by amplifying utilizing the integrating amplifier 108 having an integration characteristic G2(s), the bus current ID1 which flows through the DC bus 6 and from which the current component of magnitude not greater than an absolute value |Iomax| have been eliminated is subtracted from the voltage command value VD* outputted from the voltage command value setting unit 101 by means of the adder-subtractor 104.

In addition, by subtracting from the output of the adder-subtractor 104 a signal value obtained by multiplying the bus current ID1 by the coefficient R by means of the adder-subtractor 102, the voltage command value VD*1 for the voltage control circuit 13 which is given by the following expression can be obtained.

$$VD*1 = VD*-G2(s) \times ID1 - R \times ID1$$

At this juncture, it should be mentioned that the command value generating circuit 24d for the rectifier 21 is implemented in a configuration substantially identical with that of the command value generating circuit 14d.

Accordingly, the voltage command value for the voltage control circuits 13 and 23 is corrected not only by a signal which bears a proportional relation to the bus current ID1 flowing through the DC bus 6 but also by the signal from which the offset error of the bus current ID1 has been eliminated and amplified by the amplifier having an integration characteristic. The output voltages in the rectifiers 11 and 21 are controlled by the voltage control circuits 13 and 23, respectively. Thus, unbalance in the output voltage and the output current between the rectifiers 11 and 21 can satisfactorily be suppressed, whereby the parallel operation of the rectifiers 11 and 21 can be realized in a satisfactorily stabilized state. In addition, unnecessary correction of the voltage command value due to the offset error of the current detector can be prevented.

Embodiment 5

In the rectifier control system according to the fourth embodiment of the invention, an arrangement is adopted such that the voltage appearing on the DC bus 6 upon parallel operation of both the rectifiers 11 and 21 becomes substantially equal to an average value of the DC voltage generated by either one of the rectifiers (i.e., 11 or 21) operating independently. In the case of the rectifier control system according to a fifth embodiment of the invention, a command value generating circuit 14e (FIG. 10) is arranged so that a deviation or difference between the DC current command ID1* (>0) outputted from the current command value setting unit 110 and the direct bus current ID1 is arithmetically determined by means of an adder-subtractor 111, whereupon the output of the adder-subtractor 111 is amplified by the integrating amplifier 108 having an integration characteristic G2(s), the output of the integrating amplifier 108 being then inputted to the limiter circuit 107 so that the output of the integrating amplifier 108 becomes effective only when it is of negative polarity. As a result of this, the voltage of the DC bus 6 can be set approximately to a minimum value of the DC voltage generated when the rectifier 11 or 21 for parallel operation is operated independently.

Figure 11:
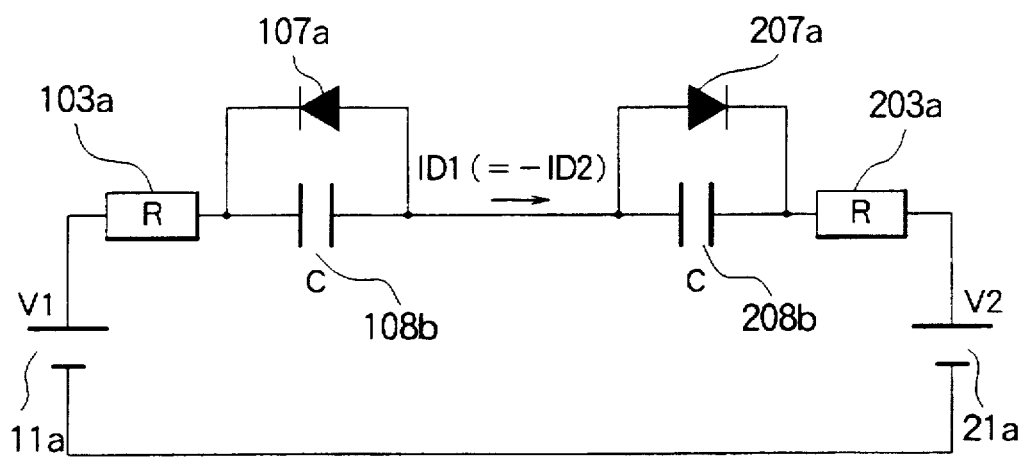
FIG. 11 is an equivalent circuit diagram for illustrating the principle of parallel operation of the rectifiers in the rectifier control system according to the fifth embodiment of the invention.

FIG. 11 is a schematic equivalent circuit diagram for illustrating the principle of the parallel operation of the rectifiers 11 and 21 in the rectifier control system according to the fifth embodiment of the invention. Referring to FIG. 11, by connecting a virtual diode 107a in parallel to a virtual capacitor 108a, the virtual capacitor 108a is charged only when the bus current ID1 is of positive polarity, bringing about a voltage drop which is effective for causing the voltage command value to droop steeply. In other words, the virtual capacitors 108a and 208a can operate only in the direction to lower steeply the voltage command value due to the presence of the virtual diodes 107a and 207a. Consequently, the voltage on the DC bus 6 assumes substantially a minimum value of the DC voltage VD generated when the rectifier 11 or 21 operates independently or solely. The function of the virtual diode 107a can be realized by providing a limiter circuit 107 which allows a current of negative polarity to pass therethrough while suppressing to zero any input current of positive polarity.

Thus, in the command value generating circuit 14e for the rectifier 11, a deviation or difference between the DC current command ID1* (>0) outputted from the current command value setting unit 110 and the direct bus current ID1 is arithmetically determined by the adder-subtractor 111 on the basis of the voltage command value VD* outputted from the voltage command value setting unit 101, whereupon the output signal of the adder-subtractor 111 is amplified by the integrating amplifier 108 having an integration characteristic G2(s). Additionally, the output of the integrating amplifier 108 is supplied to the adder-subtractor 104 via the limiter circuit 107 which is designed to pass therethrough the input signal of negative polarity while outputting zero in response to the input of positive polarity signal and is added to the voltage command value VD*. Subsequently, a signal or value obtained by multiplying the bus current ID1 by the coefficient R by means of a coefficient unit 103 is subtracted from the output of the adder-subtractor 104 by means of the adder-subtractor 102. Thus, the voltage command value VD*1 given by the following expression is applied to the voltage control circuit 13. Namely, $$VD^*1 = VD^* + G2(s) \times (ID1^* - ID1) - R \times ID1$$

Further, a command value generating circuit 24e for the rectifier 21 (not shown) is implemented in a configuration substantially identical with that of the command value generating circuit 14e. Accordingly, the voltage command value for the voltage control circuits 13; 23 is corrected not only by a signal which is in proportional relation to the bus current ID1 flowing through the DC bus 6 but also by the signal of negative polarity obtained by integrating a current component greater than the current command value. The output voltages of the rectifiers 11 and 21 are controlled by the voltage control circuits 13 and 23, respectively. In this manner, the output voltages of the rectifiers 11 and 21 are balanced with each other substantially at the minimum values of the DC voltages generated by the parallel operation destined rectifiers 11 and 21, respectively, when they are operated independent of each other, whereby the parallel operation of the rectifiers 11 and 21 can be carried out in a stabilized state. Besides, unbalance in the output current between the rectifiers can be limited to a level not exceeding the current command value.

Embodiment 6

Figure 12:
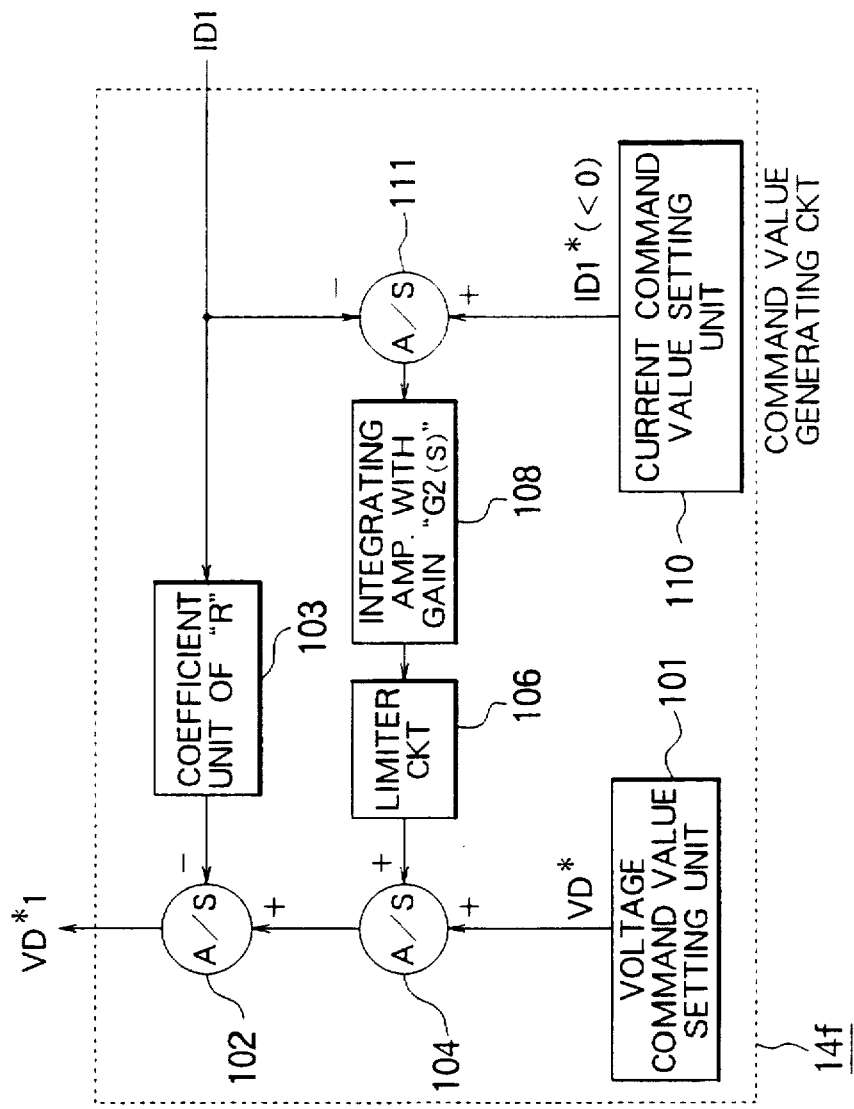
FIG. 12 is a block diagram showing a circuit configuration of a command value generating circuit according to a sixth embodiment of the present invention.

In the rectifier control system according to the fourth embodiment of the invention, such arrangement is adopted that the voltage appearing on the DC bus 6 upon parallel operation of both the rectifiers 11 and 21 is substantially equal to an average value of the DC voltage generated by either one of the rectifiers (i.e., 11 or 21) operating independently. In the case of the rectifier control system according to a sixth embodiment of the invention, a command value generating circuit 14f (FIG. 12) is so arranged that a deviation or difference between the DC current command ID1* (<0) outputted from the current command value setting unit 110 and the DC bus current ID1 is arithmetically determined by means of an adder-subtractor 111, whereupon the output of the adder-subtractor 111 is amplified by the integrating amplifier 108 having an integration characteristic G2(s), the output of the integrating amplifier 108 being then inputted to the limiter circuit 106 so that the output of the integrating amplifier 108 is effective only when it is of positive polarity. As a result of this, the voltage of the DC bus 6 can be set approximately to a maximum value of the DC voltage generated when the rectifiers 11 and 21 for the parallel operation are each operated independently.

Figure 13:
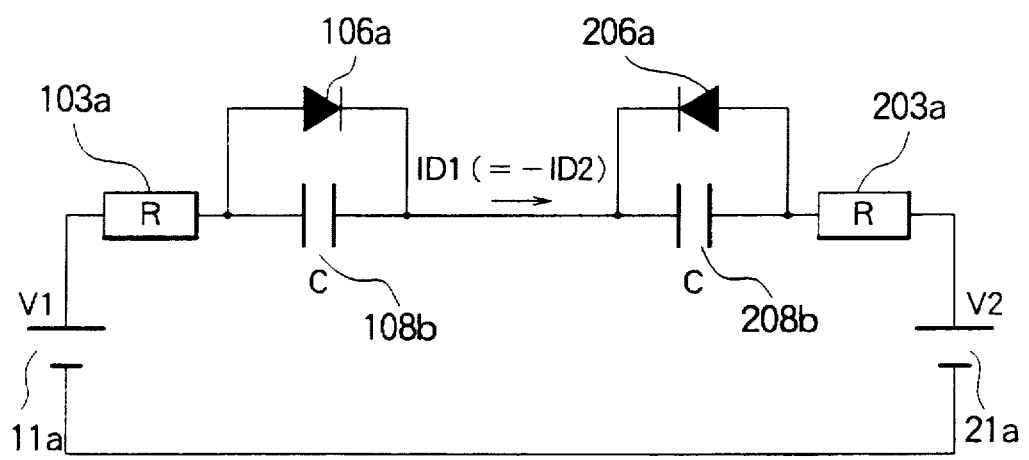
FIG. 13 is an equivalent circuit diagram for illustrating the principle of parallel operation of the rectifiers in the rectifier control system according to the sixth embodiment of the invention.

FIG. 13 is a schematic equivalent circuit diagram for illustrating the principle of the parallel operation of the rectifiers 11 and 21 in the rectifier control system according to the sixth embodiment of the invention. Referring to FIG. 13, by connecting a virtual diode 106a in parallel to a virtual capacitor 108a, the virtual capacitor 108a is charged only when the bus current ID1 is of negative polarity, bringing about a voltage drop which is effective for causing the voltage command value to rise. In other words, the virtual capacitors 108a and 208a can operate only in the direction to rise up the voltage command value due to the presence of the virtual diodes 106a and 206a, whereby the voltage on the DC bus 6 assumes substantially a maximum value of the DC voltage VD generated when the rectifier 11 or 21 operates independently or solely. The function of the virtual diode 106a can be realized by providing a limiter circuit 106 which allows a current of positive polarity to pass therethrough while suppressing to zero any input current of negative polarity.

Thus, in the command value generating circuit 14f for the rectifier 11, a deviation or difference between the DC current command ID1* (<0) outputted from the current command value setting unit 110 and the DC bus current ID1 is arithmetically determined by the adder-subtractor 111, whereupon the output signal of the adder-subtractor 111 is amplified by the integrating amplifier 108 having the integration characteristic G2(s). Additionally, the output of the integrating amplifier 108 is added to the DC current command value ID1* by the adder-subtractor 104 by way of the limiter circuit 106 which is designed to pass therethrough the signal of positive polarity while outputting zero in response to the signal of negative polarity. Subsequently, a signal or value obtained by multiplying the bus current ID1 by the coefficient R by means of a coefficient unit 103 is subtracted from the output of the adder-subtractor 104 by the adder-subtractor 102. Thus, the voltage command value VD*1 given by the following expression is applied to the voltage control circuit 13. Namely, $$VD^*1 = VD^* + G2(s) \times (ID1^* - ID1) - R \times ID1$$

Further, a command value generating circuit 24f for the rectifier 21 (not shown) is implemented in a configuration

17 substantially identical with that of the command value generating circuit 14*f*. Accordingly, the voltage command value for the voltage control circuit 13, 23 is corrected not only by a signal which is in proportional relation to the current flowing through the DC bus 6 but also by the signal of positive polarity obtained by integrating a current component exceeding the current command value. As a result of this, the output voltages of the rectifiers 11 and 21 are controlled by the voltage control circuits 13 and 23, respectively. In this manner, the output voltages of the rectifiers 11 and 21 are balanced with each other substantially at the maximum values of the DC voltages generated by the parallel operation destined rectifiers 11 and 21, respectively, when they are operated independent of each other, whereby the parallel operation of these rectifiers 11 and 21 can be realized in a much stabilized state. Besides, unbalance in the output current can be limited to a level not exceeding the current command value.

Embodiment 7

Figure 14:
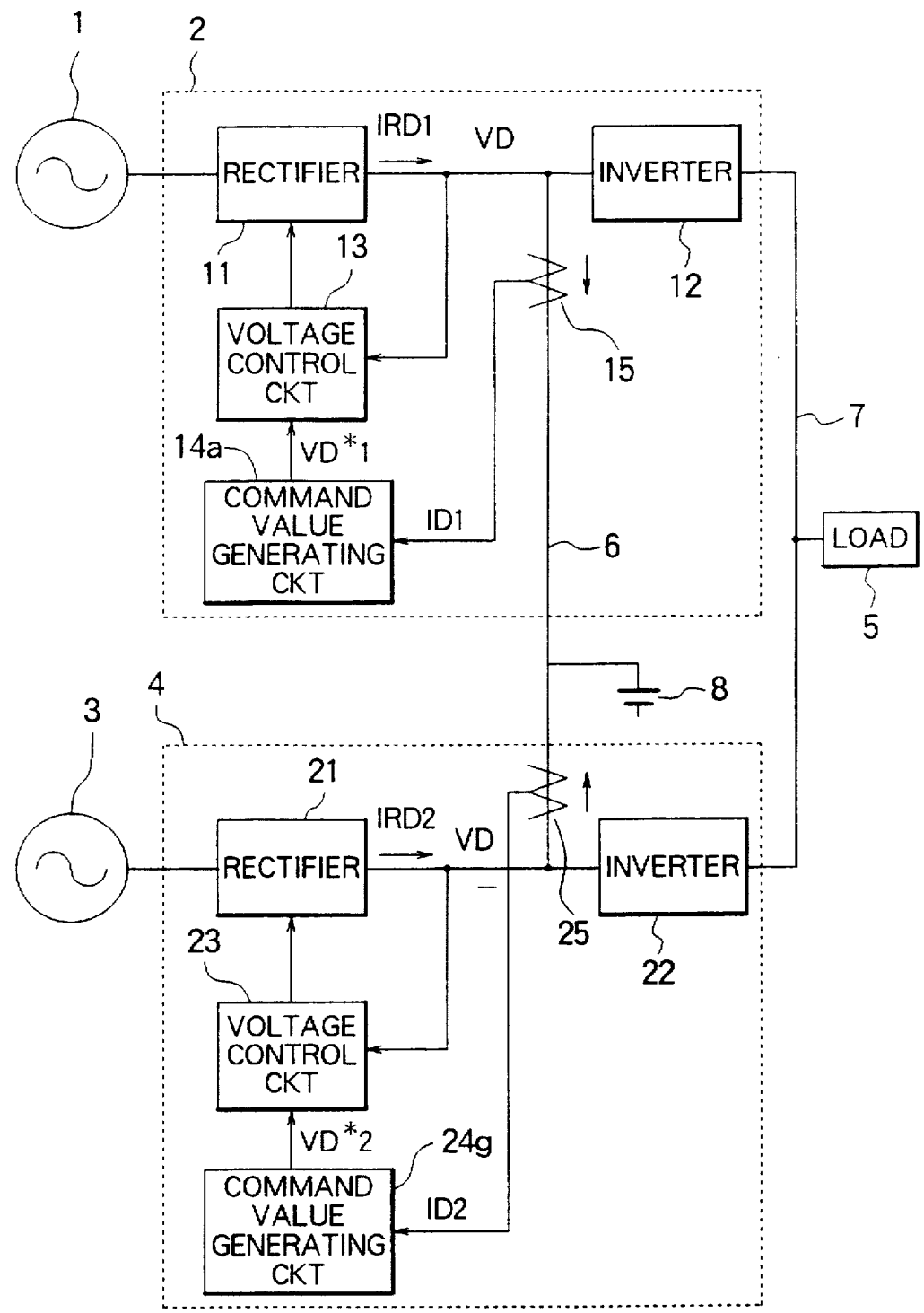
FIG. 14 is a circuit diagram showing a configuration of a rectifier control system according to a seventh embodiment of the present invention.

In the case of the rectifier control system according to the fifth embodiment of the invention, the integration control for the current not greater than the direct current command value ID1* (>0) is stopped in appearance. By contrast, the rectifier control system according to a seventh embodiment of the invention is so designed that the correction of the voltage command VD* by means of the coefficient unit 103 is performed for all the currents. To this end, a battery 8 is connected to the DC bus 6, as is shown in FIG. 14, so that when the rectifiers 11 and 21 supply a DC power to the battery 8 upon charging of the battery 8 with the charging current corresponding to the direct current command value ID1*, then the current command value VD* is caused to droop by means of the coefficient unit 103 although the integration control brings about no droop of the voltage command value VD* due to the charging current.

Figure 10:
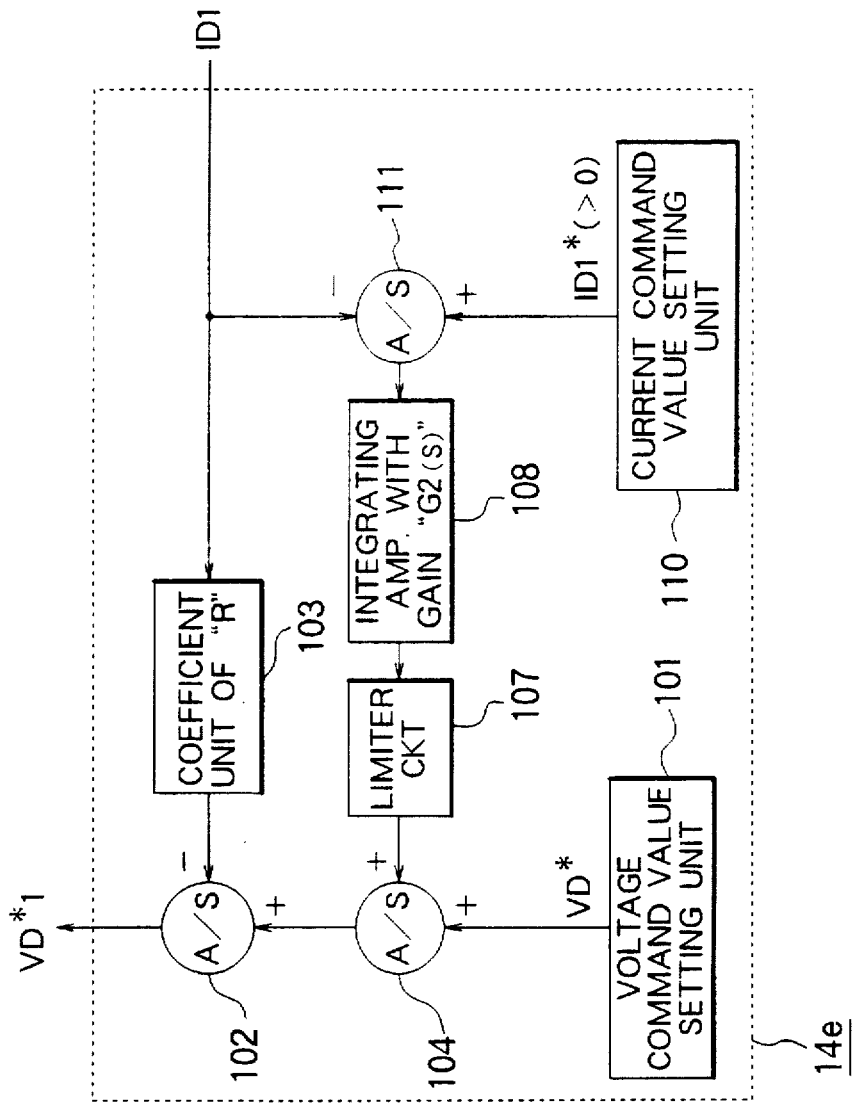
FIG. 10 is a block diagram showing a circuit structure of a command value generating circuit according to a fifth embodiment of the present invention.
Figure 15:
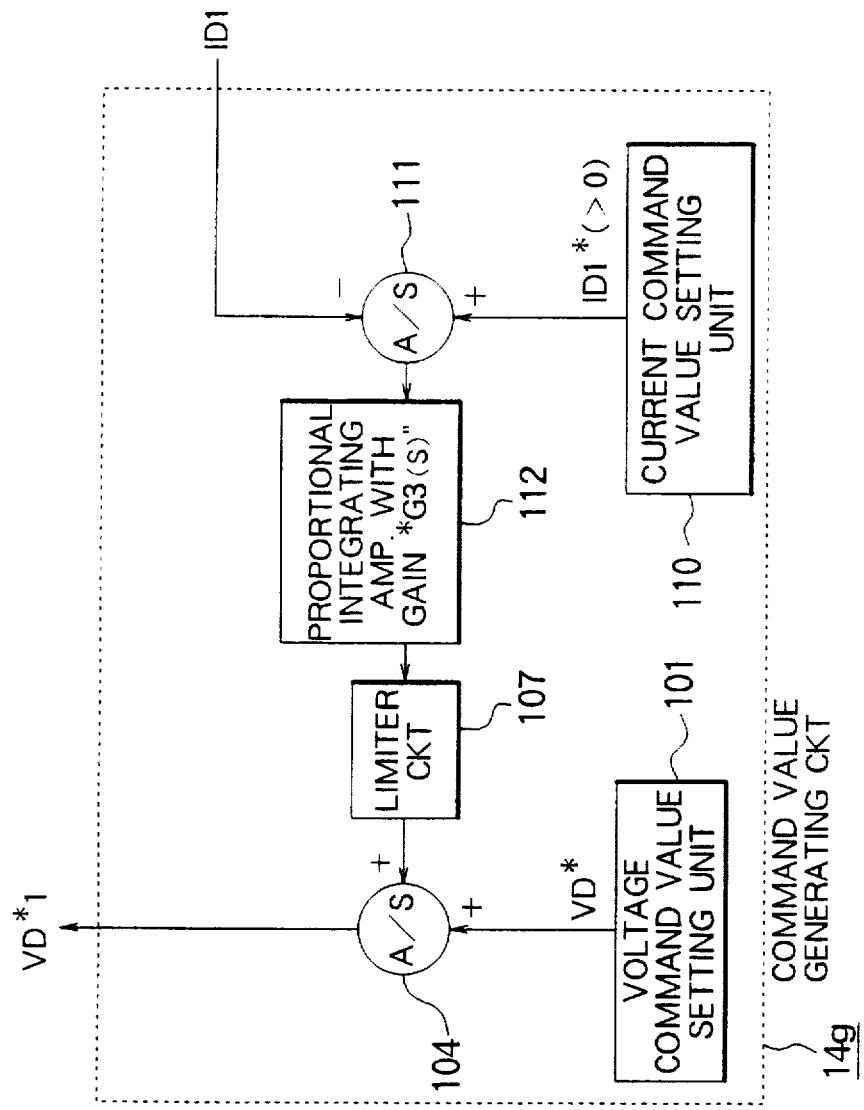
FIG. 15 is a block diagram showing a circuit configuration of a command value generating circuit according to the seventh embodiment of the invention.

In this way, in order to prevent the voltage command value VD* from being corrected by the charging current, the input of the coefficient unit 103 shown in FIG. 10 should be derived from the input to an adder-subtractor 111. In other words, the coefficient unit 103 and the integrating amplifier 108 shown in FIG. 10 are implemented in a single block of proportional integrating amplifier 112, as in the case of the command value generating circuit 14*g* shown in FIG. 15. By providing the limiter circuit 107 for the output of the proportional integrating amplifier 112, it can be avoided to correct unnecessarily the voltage command value VD* so long as the current command value ID1* is not greater than the bus current ID1 even when the bus current ID1 is of positive polarity.

Figure 16:
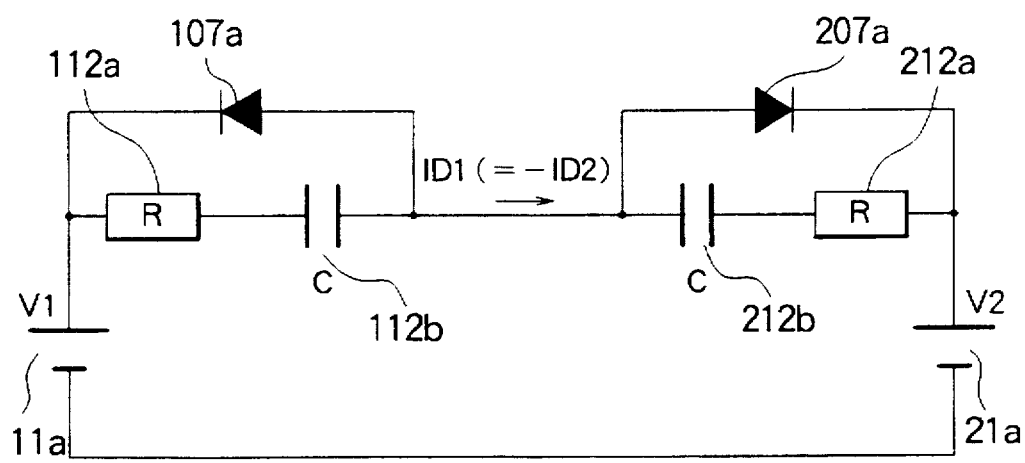
FIG. 16 is an equivalent circuit diagram for illustrating the principle of parallel operation of rectifiers according to the seventh embodiment of the invention.

FIG. 16 is an equivalent circuit diagram for illustrating the principle of parallel operation of the rectifiers 11 and 21 in the rectifier control system according to the seventh embodiment of the invention. By connecting a virtual diode 107*a* in parallel to a series circuit of a virtual resistor 112*a* and a virtual capacitor 112*b*, voltage drop appearing across the series circuit is only effective to lower steep decreasing of the voltage command value VD*. Similarly, a virtual resistor 212*a*, a virtual capacitor 212*b* and a virtual diode 207*a* operate only in the direction effective to decrease the voltage command value VD*, as a result of which the voltage of the DC bus 6 becomes balanced substantially at a minimum value of the DC output voltage generated by each of the rectifier 11 or 21 when it is operated independently.

Thus, in the command value generating circuit 14*g* for the rectifier 11, a deviation or difference between the DC current command ID1* (>0) outputted from the current command value setting unit 110 and the DC bus current ID1 is arithmetically determined by the adder-subtractor 111 on the basis of the voltage command value VD* outputted from the voltage command value setting unit 101, whereupon the output signal of the adder-subtractor 111 is amplified by the integrating amplifier 112 having the proportional integration characteristic G3(s). Subsequently, the output of the integrating amplifier 108 is inputted to the adder-subtractor 104 through the limiter circuit 107 which is designed to pass therethrough the input signal of negative polarity while outputting zero in response to the input of positive polarity and is added to the voltage command value VD*. Thus, the voltage command value VD*1 after correction given by the following expression is applied to the voltage control circuit 13. Namely, $$VD^*1 = VD^* + G3(s) \times (ID1^* - ID1)$$

A command value generating circuit 24*g* for the rectifier 21 (not shown) is implemented in a configuration substantially identical with that of the command value generating circuit 14*g*. Accordingly, the voltage command value VD* for the voltage control circuits 13; 23 is corrected by signal of negative polarity obtained by proportional integration of the deviation or difference between the current command value and the DC bus current ID1 flowing through the DC bus 6. The output voltages of the rectifiers 11 and 21 are controlled by the voltage control circuits 13 and 23, respectively. In this manner, the output voltages of the rectifiers 11 and 21 are balanced with each other substantially at the minimum values of the DC output voltages generated by the rectifiers 11 and 21, respectively, when they are operated independent of each other. Hence the parallel operation of the rectifiers 11 and 21 can be carried out in a sufficiently stabilized state. Besides, the voltage command value VD* is not corrected unnecessarily due to the charging current of a battery 8 connected to the DC bus 6.

Embodiment 8

Figure 17:
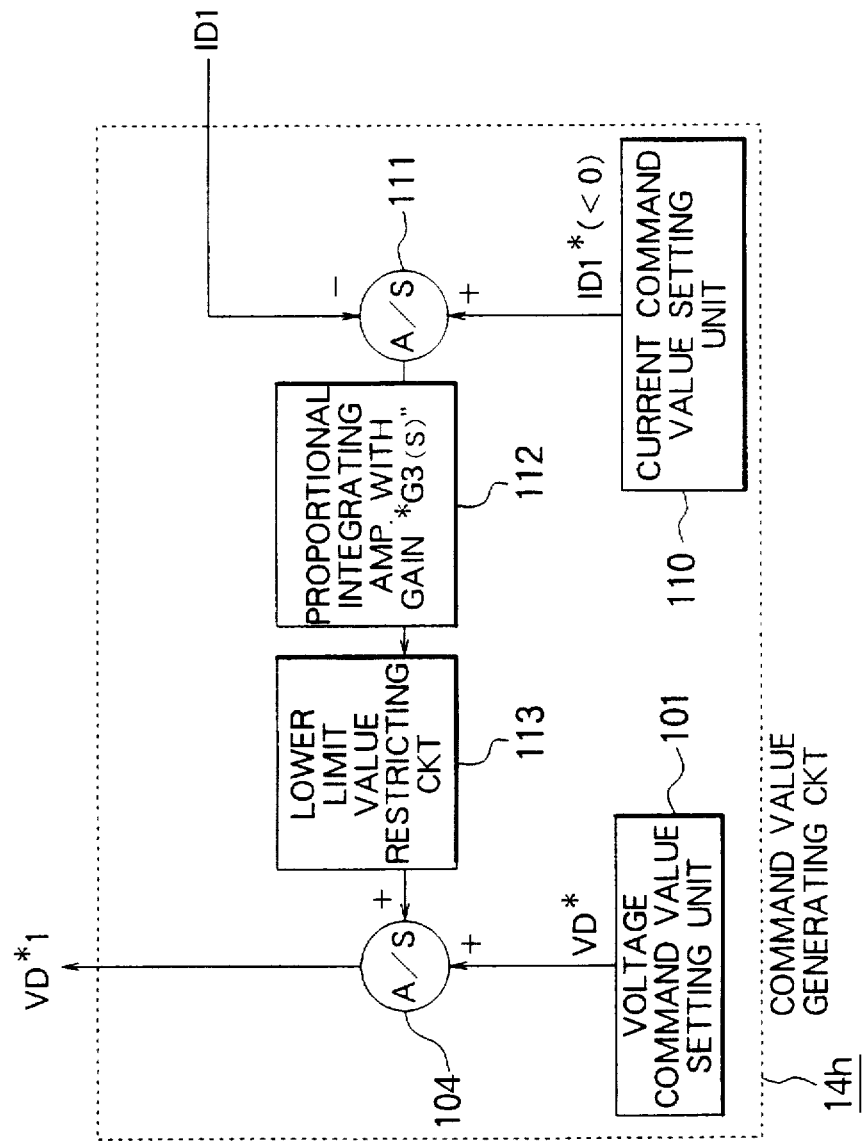
FIG. 17 is a block diagram showing a circuit configuration of a command value generating circuit according to an eighth embodiment of the present invention.

In the case of the rectifier control system according to the seventh embodiment of the invention, there may arise such undesirable situation that upon occurrence of a fault, for example, in the current detector 15, a large value signal of positive polarity is outputted constantly from the current detector 15. In that case, the voltage command value VD*1 as corrected by integrating with the proportional integrating amplifier 112 in FIG. 15 drops abnormally. For coping with this problem, there is provided a lower limit value restricting circuit 113 which is arranged to output zero in response to an input of positive polarity while allowing an input of negative polarity to pass therethrough and in which a lower limit value corresponding to a lowest DC voltage appearing when an inverter 12 operates to output a voltage of negative polarity is set, as in the case of the command value generating circuit 14*h* shown in FIG. 17. By virtue of this arrangement, the inverter 12 is capable of holding the voltage of the DC bus 6 at an operatable voltage level even upon occurrence of a positive overshoot fault in the current detector.

Embodiment 9

Figure 18:
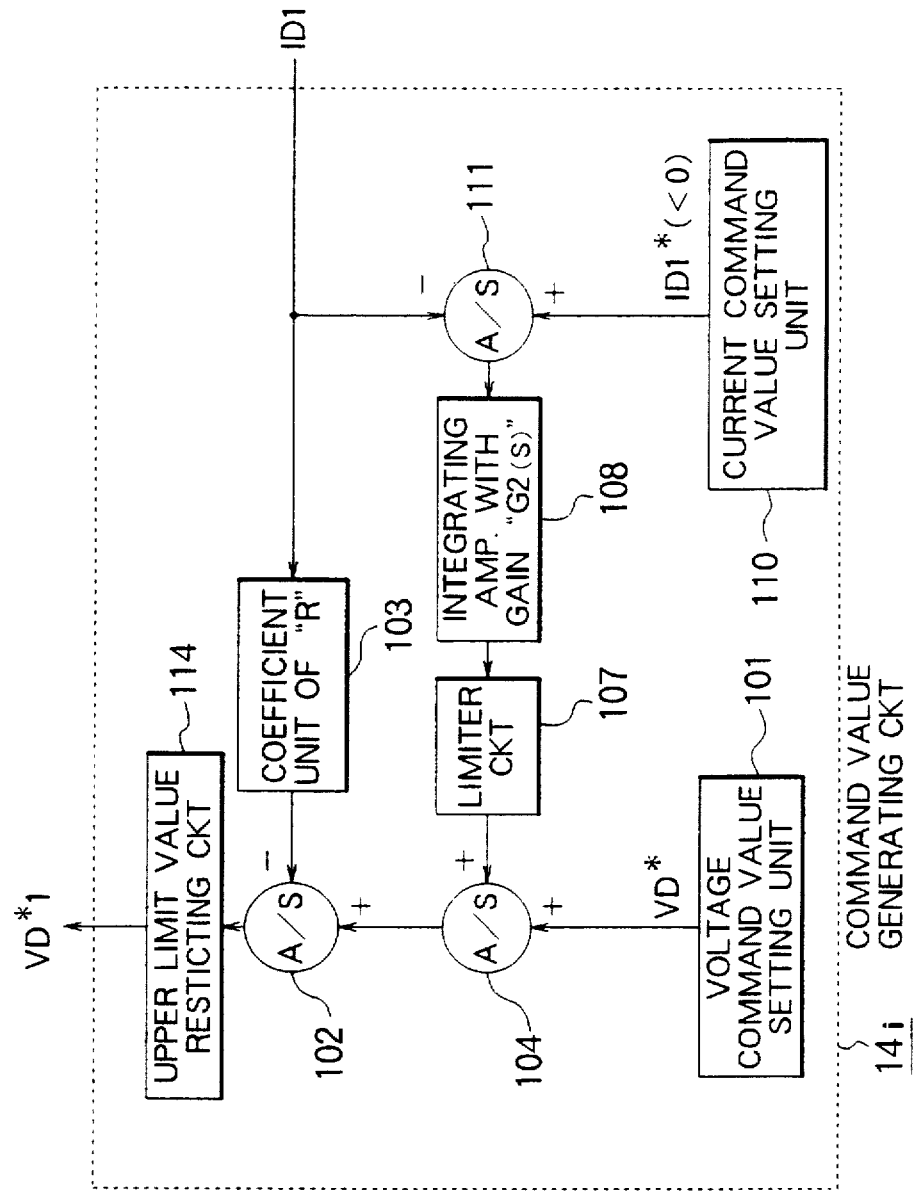
FIG. 18 is a block diagram showing a circuit configuration of a command value generating circuit according to a ninth embodiment of the present invention.

In the case of the rectifier control system according to the sixth embodiment of the invention, there may arise such undesirable situation that upon occurrence of a fault, for example, in the current detector 15, a large value signal of negative polarity is outputted constantly from the current detector 15. In that case, the voltage command value VD*1 as corrected by integrating with the integrating amplifier 108 shown in FIG. 12 rises abnormally. For coping with this problem, there is provided an upper limit value restricting circuit 114 which is so arranged as to output zero in response to an input of positive polarity while allowing an input of negative polarity to pass therethrough and in which an upper limit value corresponding to the largest DC voltage appearing when the inverter 12 operates to output a voltage of positive polarity is set, as in the case of the command value generating circuit 14i shown in FIG. 18. By virtue of this arrangement, the inverter 12 is capable of holding the voltage of the DC bus 6 at an operatable voltage level even upon occurrence of a negative overshoot fault in the current detector.

Embodiment 10

In the case of the rectifier control system according to the first to ninth embodiments of the invention, unbalances between the rectifiers 11 and 21 in the output voltage and the output current are canceled by correcting the voltage command value VD* by causing the voltage control loop to respond correspondingly. The instant embodiment of the invention is directed to a rectifier control system for canceling the unbalances in the output voltages and in the output currents between the rectifiers which are constituted by thyristors, respectively, at a highest speed which the response speed of the voltage control system or loop permits.

Figure 19:
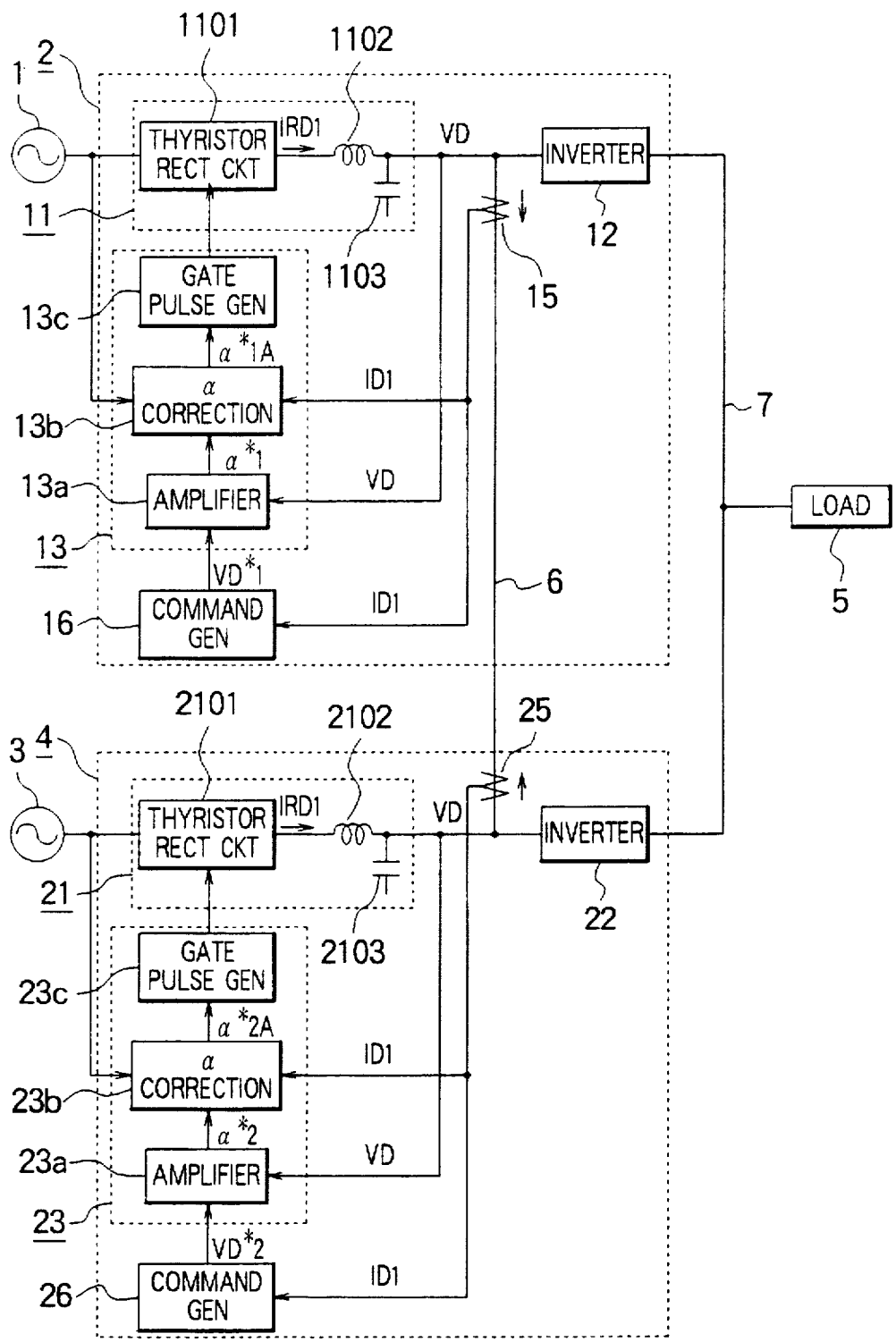
FIG. 19 is a circuit diagram showing a configuration of a rectifier control system according to a tenth embodiment of the present invention.

FIG. 19 is a block diagram showing a circuit configuration of the rectifier control system according to a tenth embodiment of the present invention. In the figure, reference numerals 1 to 7, 12, 15, 16, 22, 25 and 26 designate like components or parts as those described hereinbefore in conjunction with the conventional rectifier control system and the first to ninth embodiments of the invention. Accordingly, repeated description of these parts will be unnecessary. Referring to FIG. 19, a thyristor rectifier circuit 11 is comprised of a thyristor rectifier main circuitry 1101 realized by a plurality of thyristor elements connected together in the form of a bridge circuit, and a reactor 1102 and a capacitor 1103 which cooperate to constitute a filter for smoothing a DC output voltage of the thyristor rectifier main circuitry 1101. Similarly, a thyristor rectifier circuit 21 is comprised of a thyristor rectifier main circuitry 2101, and a reactor 2102 and a capacitor 2103 which cooperate to constitute a filter for smoothing a DC output voltage.

A voltage controller (i.e., voltage control circuit) 13 of the power converter 2 includes an amplifier 13a for determining an error or difference between the voltage command value VD*1 and the voltage feedback VD and amplifying the error to thereby output a phase-control angle command value α*1 for the thyristor rectifier circuit 11, an α-command correcting circuit 13b for correcting a phase-control angle command value α*1 such that the current flowing through the DC bus 6 can be suppressed, and a gate pulse generator (GPG) 13c for outputting firing pulses to gates of the thyristor elements in response to inputting of a phase-control angle command value α*1A which has undergone correction by the α-command value correcting circuit 13b. Similarly, a voltage control circuit 23 of the power converter 4 includes an amplifier 23a, an α-command correcting circuit 23b and a gate pulse generator (GPG) 23c interconnected essentially in a same manner as those constituting the voltage control circuit 13.

Before entering into description of operation of the rectifier control system according to the instant embodiment of the invention, relation between the phase-control angle α of the thyristor rectifier circuit 11, 21 and the output voltage V of the thyristor rectifier main circuitry 1101, 2101 will first be elucidated. In the case where the thyristor rectifier main circuitry 1101, 2101 is implemented as a three-phase bridge rectifier circuit, a DC output voltage VTH can be given by the following expression (1), as described in "HANDOTAI DENRYOKU HENKAN KAIRO (SEMICONDUCTOR POWER CONVERSION CIRCUIT)" published by "THE INSTITUTE OF ELECTRICAL ENGINEERS OF JAPAN", p. 179.

$$VTH = 3 \times \sqrt{2} \times E/\pi \times \cos\alpha \tag{1}$$

where E represents an effective value of a line voltage. Further, line voltages Euv, Evw and Euw are given by the following expressions (2), (3) and (4), respectively.

$$Euv = \sqrt{2} \times E \times \sin(\omega t) \tag{2}$$

$$Evw = \sqrt{2} \times E \times \sin(\omega t + \pi/3) \tag{3}$$

$$Ewu = \sqrt{2} \times E \times \sin(\omega t + 2\pi/3) \tag{4}$$

When a drop of the output voltage VTH of the thyristor rectifier main circuitry 1101, 2101 which occurs upon increasing of the phase-control angle α by Δα is represented by ΔVTH, the following expression (5) applies valid.

$$VTH - \Delta VTH = 3 \times \sqrt{2} \times E/\pi \times \cos(\alpha + \Delta\alpha) \tag{5}$$

The above expression (5) can be rewritten as follows:

$$VTH - \Delta VTH = 3 \times \sqrt{2} \times E/\pi \times (\cos\alpha \cos\Delta\alpha - \sin\alpha \sin\Delta\alpha) \tag{6}$$

In case the angle increment Δα is so small that cos Δα=1 can be satisfied, the above expression (6) can be rewritten as follows:

$$VTH - \Delta VTH = 3 \times \sqrt{2} \times E/\pi \times (\cos\alpha - \sin\alpha \sin\Delta\alpha) \tag{7}$$

From the expressions (1) and (7), there can be derived the following expression (8).

$$\Delta VTH = 3 \times \sqrt{2} \times E/\pi \times \sin\alpha \times \sin\Delta\alpha) \tag{8}$$

From the expression (8), the quantity Δα can be determined in accordance with the following expression (9).

$$\Delta\alpha = \sin^{-1}\{\Delta VTH/(3 \times \sqrt{2} \ /\pi)/E/\sin\alpha)\} \tag{9}$$

As is apparent from the above expression (9), the increment α of the control angle for dropping the output voltage of the thyristor rectifier main circuitry 1101, 2101 by ΔVTH can be determined on the basis of the control angle α and the effective line voltage value E.

In the rectifier control system according to the instant embodiment of the invention, in order to make the output voltage drop of the thyristor rectifier main circuitry 1101, 2101 be proportional to the current flowing through the DC bus 6, an output voltage drop command value for the α-command correcting circuit 13b, 23b of the thyristor rectifier main circuitry 1101, 2101 is first determined, where the increment Δα of the phase-control angle α is arithmetically determined on the basis of the output voltage droop command value, to thereby correct the phase-control angle α.

Figure 20:
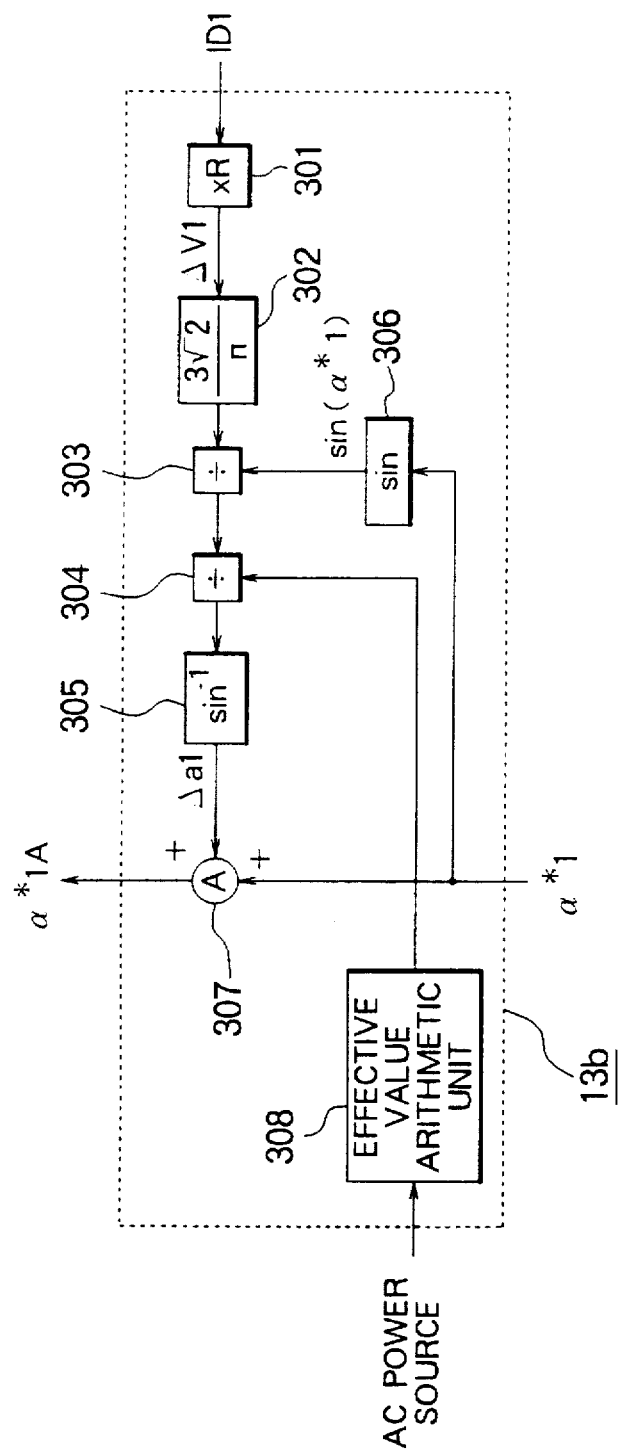
FIG. 20 is a block diagram showing a circuit configuration of an α-command correcting circuit according to the tenth embodiment of the invention.

FIG. 20 is a block diagram showing a circuit arrangement of the α-command correcting circuit 13b. As can be seen in the figure, the α-command correcting circuit 13b is comprised of a coefficient unit 301 for determining the output voltage drop characteristic command value ΔV1 by multiplying the bus current ID1 detected by the current detector 15 by a coefficient or factor "R", a coefficient unit 302 having a gain "$3\sqrt{2}/\pi$" for multiplying the output voltage drop characteristic command value ΔV1 by "$3\sqrt{2}/\pi$", an analogue divider 303 for dividing the result of the arithmetic operation performed by the coefficient unit 302 by "sin (α*1)" which is determined by a sinusoidal arithmetic unit 306, an analogue divider 304 for dividing the result of the arithmetic operation performed by the analogue divider 303 by an effective line voltage value E determined by an effective value arithmetic unit 308, an arc-sinusoidal arithmetic unit 305 for determining the increment Δα1 of the phase-control angle command value α*1 on the basis of the result of the division performed by the analogue divider 304, and an adder 307 for outputting a phase-control angle command value α*1A corrected by adding the increment Δα1 to the phase-control angle α*1 to be outputted to the gate pulse generator 13.

Figure 21:
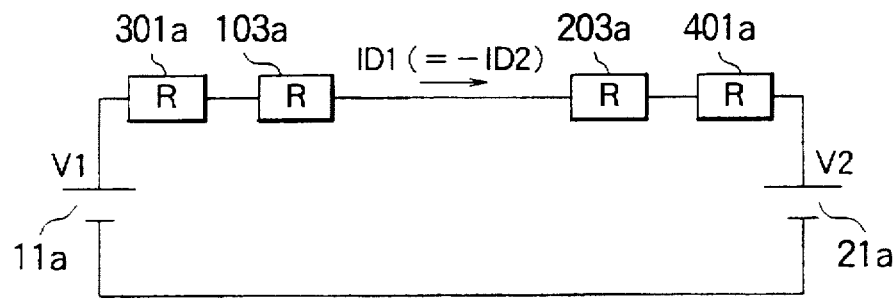
FIG. 21 is an equivalent circuit diagram for illustrating the principle of parallel operation of rectifiers according to the tenth embodiment of the invention.

FIG. 21 is an equivalent circuit diagram for illustrating the principle underlying the parallel operation of the thyristor rectifier circuits 11 and 21 in the rectifier control system according to the tenth embodiment of the invention. A voltage supply source 11a generates a DC voltage V1 corresponding to a DC output voltage generated by the thyristor rectifier circuit 11 when it operates solely or independently. Similarly, a voltage supply source 21a generates a DC voltage V2 which corresponds to a DC output voltage generated by the thyristor rectifier circuit 21 when it is operated solely. A virtual resistor 301a is to simulate the operation of the coefficient unit 301 for determining the output voltage droop characteristic command value ΔV1 which is proportional to the current flowing through the DC bus 6, while a virtual resistor 403a is to simulate operation of the coefficient unit which corresponds to the coefficient unit 301 incorporated in the α-command correcting circuit 23b of the thyristor rectifier circuit 21, wherein each of the virtual resistors 301a and 403a has a resistance value "R".

Figure 36:
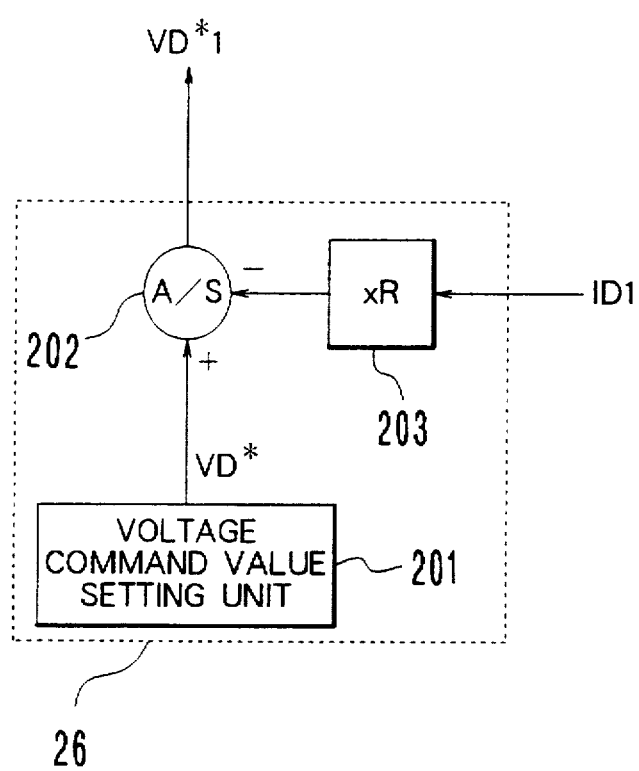
FIG. 36 is a block diagram illustrating a circuit arrangement of a command value generating circuit of the related art.

Further, a virtual resistor 103a is to simulate operation of the coefficient unit 103 incorporated in the command value generating circuit 16 (refer to FIG. 36), while a virtual resistor 203a is to simulate operation of the coefficient unit equivalent to the coefficient unit 103 of the command value generating circuit 26. Each of the virtual resistors 103a and 203a has a resistance value set equal to "R".

When the thyristor rectifier circuits 11 and 21 are operated in parallel in the case where the voltage difference ΔV (=V1−V2) exists between the direct voltage sources 11a and 21a, the α-command correcting circuits 13b and 23b are first put into operation, whereby the bus current ID1 flowing through the DC bus 6 in the parallel operation of the thyristor rectifier circuits 11 and 21 is limited to ΔV/2R by means of the virtual resistors 301a and 401a.

Since the virtual resistor 301a, 401a operates in a feed-forward fashion to exert a disturbance to the voltage control system, they can operate as the resistors at a high speed before the virtual resistor 103a, 203a representative of the command value generating circuit 16, 26 starts to operate. Subsequently, virtual resistance operation of the virtual resistor 301a, 401a which intrinsically represents the disturbance is suppressed by the amplifier 13a, 23a which operates to make the voltage command value VD*1 coincide with the voltage feedback VD. In that case, the voltage command value is corrected by the bus current, thereby restoring operation of the virtual resistor 103a, 203a.

Accordingly, the bus current ID1 flowing through the DC bus 6 is normally limited to a value given by the following expression:

$$ID1 = \Delta V/2R$$

As will now be understood, the α-command correcting circuit 13b of the thyristor rectifier circuit 11 determines the output voltage drop characteristic command value ΔV1 by multiplying the bus current ID1 flowing through the DC bus 6 and detected by the current detector 15 by a coefficient "R" by means of the coefficient unit 301. On the basis of the output voltage drop characteristic command value ΔV1, the effective value of the AC power source 1 detected by the effective value arithmetic unit 308, the voltage command value VD*1 and the value "sin (α*1)" as determined arithmetically by means of the sinusoidal arithmetic unit 306 so as to make the voltage command value VD*1 coincide with the voltage feedback VD, an increment Δα1 of the thyristor rectifier phase-control angle command value α*1 is determined in accordance with the expression (9) mentioned previously through cooperation of the coefficient unit 302 having a gain "$3\sqrt{2}/\pi$" and the analogue dividers 303 and 304 and the arc-sinusoidal arithmetic unit 305. The increment Δα1 thus determined is added to the phase-control angle command value α*1 by means of an adder 307, whereby a corrected phase-control angle command value α*1A is determined. Since the corrected phase-control angle command value α*1A is outputted to the gate pulse generator 13c which is designed to output the firing pulses to the gates of the thyristors, the output voltage of the thyristor rectifier main circuitry 1101 drops by ΔV1=ID1×R. Furthermore, because the α-command correcting circuit 23b of the thyristor rectifier circuit 21 is implemented in a similar structure, unbalances in the output voltages and the output currents between the rectifiers can be suppressed at higher speed than the response speed of the voltage control system.

Embodiment 11

Figure 22:
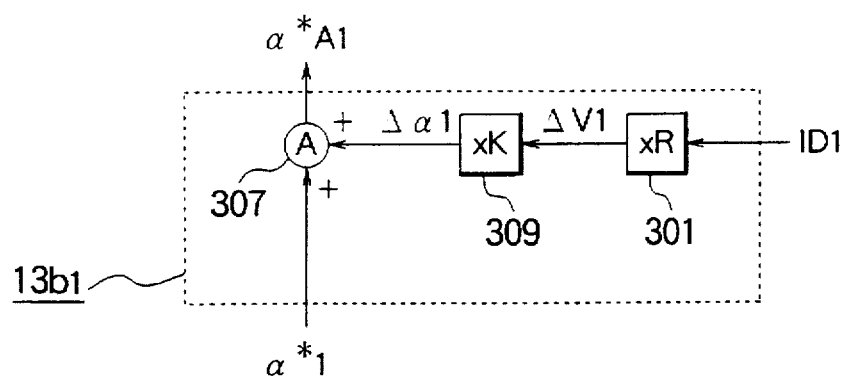
FIG. 22 is a block diagram showing a circuit configuration of an α-command correcting circuit according to an eleventh embodiment of the present invention.

The arithmetic operations for correcting the increments Δα1 and Δα2 of the phase-control angle command values α*1 and α*2 on the basis of the output voltage drop characteristic command value ΔV1 and ΔV2, respectively, as performed by the α-command value correcting circuit 13b (FIG. 20) of the rectifier control system according to the tenth embodiment of the invention can also be carried out by using an α-command correcting circuit 13b1 of a simplified structure such as shown in FIG. 22 when compared with the above-mentioned α-command correcting circuit 13b on the condition that the AC power source and the DC voltage command value as set scarcely undergo variations.

Now referring to FIG. 22, the bus current ID1 detected by the current detector 15 is multiplied by "R" by means of a coefficient unit 301, to thereby arithmetically determine the output voltage drop characteristic command value ΔV1. On the other hand, a coefficient unit 309 is designed to arithmetically determine an increment Δα1 of the phase-control angle command value α*1 by multiplying the output voltage drop characteristic command value ΔV1 by "K". The increment Δα1 thus determined is added to the phase-control angle command value α*1 by the adder 307, whereby a corrected phase-control angle command value α*1 can be determined.

Before entering into description of operation of the α-command correcting circuit 13b1, a correction arithmetic principle underlying the instant embodiment of the invention will be explained. The relation between the increment Δα of the phase-control angle α and the drop ΔVTH of the output voltage VTH generated by the thyristor rectifier circuit is given by the expression (9) mentioned hereinbefore. In this conjunction, it is however noted that there arises essentially no need for treating the term "E sin α" as a variable on the condition that the AC power source and the DC voltage command value as set are not subjected to any appreciable variations. Accordingly, the expression for the increment Δα can be represented as follows:

$$\Delta\alpha = \sin^{-1}(VTH \times K) \quad (10)$$

where K is given by the following expression (11).

$$K = (3 \times \sqrt{2}/\pi)/E0/\sin\theta \quad (11)$$

where E0 represents a rated AC source voltage and α0 represents a phase-control angle in the rated operation. Besides, when the quantity "VTH×K" is very small, the increment Δα may be given by the following expression (12).

$$\Delta\alpha = VTH \times K \quad (12)$$

The bus current ID1 detected by the current detector 15 is multiplied by "R" by means of the coefficient unit 301, whereby the output voltage drop characteristic command value ΔV1 is determined. Further, the output voltage drop characteristic command value ΔV1 is multiplied by "K" by means of the coefficient unit 309 in accordance with the expression (12), whereby the increment Δα1 of the corrected phase-control angle command value α*1 is determined. The increment Δα1 is then added to the phase-control angle command value α*1 by the adder 307, as the result of which the corrected phase-control angle command value α*1A is supplied to a gate pulse generator 13c designed to output the firing pulses to the gate electrodes of the thyristors, respectively. As a consequence of this, the output voltage of the thyristor rectifier main circuit 1101 is caused to droop by ΔV1 (=ID1×R). Needless to say, the α-command correcting circuit 23b1 may be implemented in a structure similar to that of the α-command correcting circuit 13b1.

As can be seen from the above description, in the case where the AC power source and the DC voltage command value scarcely undergo any appreciable variations, the α-command correcting circuit 13b1, 23b1 of the thyristor rectifier circuit 11, 21 operates in a feed-forward fashion as disturbance to the voltage control system. As a result of this, resistance value of the virtual resistor 301a, 401a operating at a high speed can be determined through simple arithmetic operation, whereby unbalance in the output voltage as well as the output current between the thyristor rectifier circuits 11 and 21 can be nullified at a higher speed than the response speed of the voltage control system.

Embodiment 12

In the rectifier control system according to the eleventh embodiment of the invention, the bus current ID1 will contain a harmonic component or components when the outputs of the AC power sources 1 and 3 contain harmonic component(s), which in turn means that the increment Δα1 of the phase-control angle command value α*1 also contains harmonic component(s). Consequently, when the corrected phase-control angle command value α*1A contains a frequency to which the thyristor rectifier main circuitry 1101, 2101 can not respond, the voltage control system will become unstable.

Figure 23:
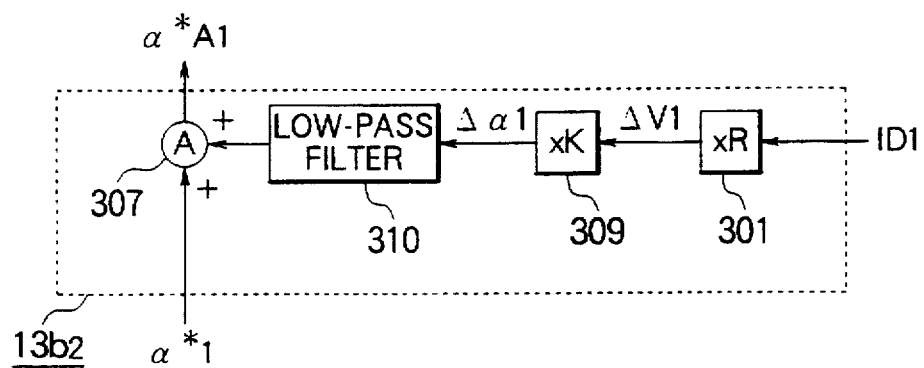
FIG. 23 is a block diagram showing a circuit configuration of an α-command correcting circuit according to a twelfth embodiment of the present invention.

With the instant embodiment of the invention, it is contemplated to cope with the problem mentioned above. FIG. 23 shows a circuit configuration of an α-command correcting circuit 13b2 according to the eleventh embodiment of the invention. As can be seen in the figure, the harmonic component(s) of the increment Δα1 having to which the thyristor rectifier main circuitry 1101, 2101 can not respond is eliminated by a low-pass filter 310. The corrected signal Δα1 undergone the harmonic component elimination processing is added to the phase-control angle command value α*1 by the adder 307, whereby the corrected phase-control angle command value α*1A is determined and supplied to the gate pulse generator 13c generating the firing pulses to the gate electrodes of the thyristors, respectively. Parenthetically, it should be mentioned that an α-command correcting circuit 23b2 of the thyristor rectifier circuit 21 is realized in a structure similar to the α-command correcting circuit 13b2 of the thyristor rectifier circuit 11. By virtue of such arrangement as mentioned above, not only the output voltage of the thyristor rectifier main circuitry 1101, 2101 can stably be dropped by ΔV1 (=ID1×R) with a much simplified structure but also unbalances in the output voltage and the output current between the rectifiers can be eliminated at a higher speed than the response speed of the voltage control system.

Embodiment 13

Figure 24:
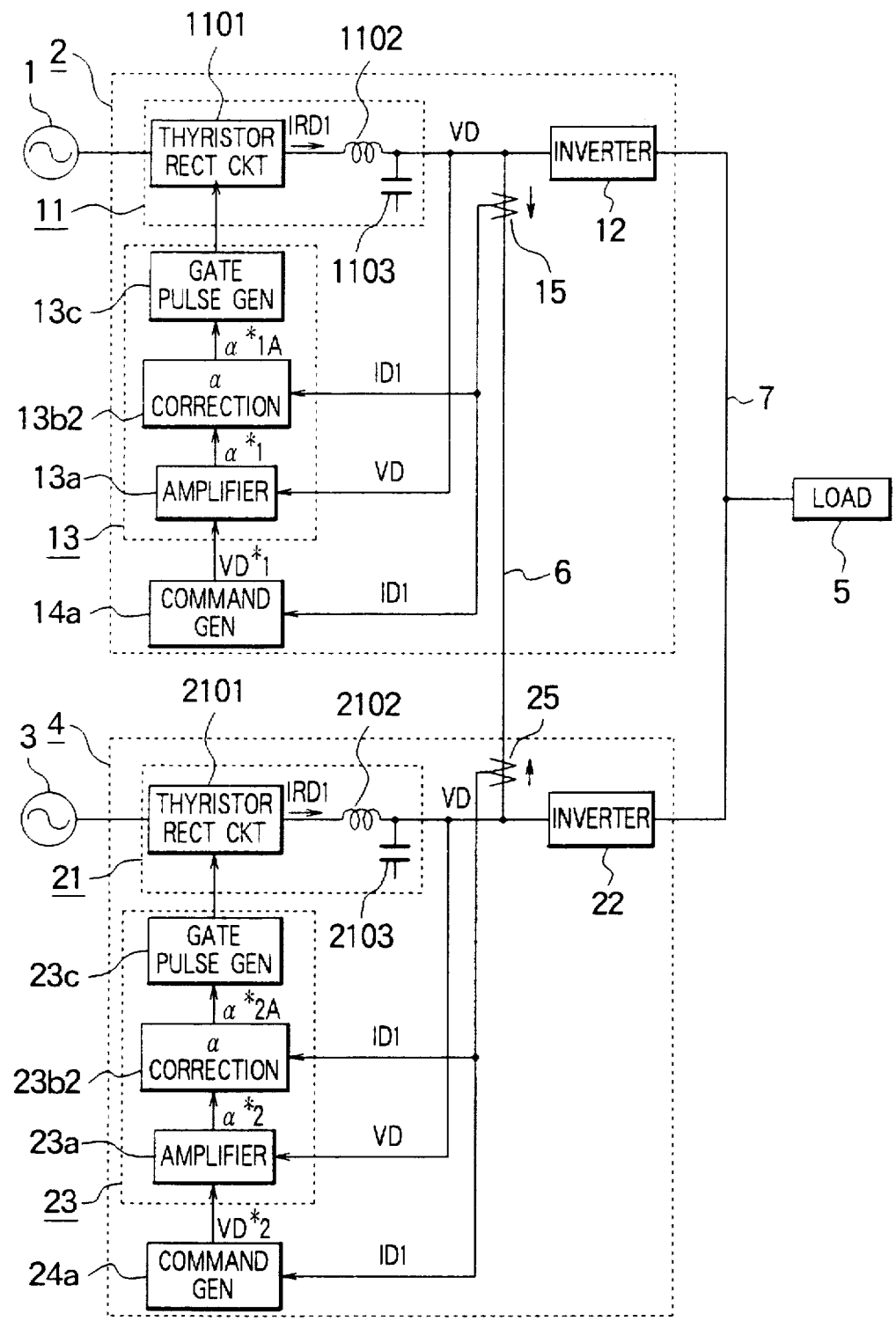
FIG. 24 is a circuit diagram showing a configuration of a rectifier control system according to a thirteenth embodiment of the present invention.

In the rectifier control system according to the twelfth embodiment of the invention, the output current unbalance represented by ΔV/2 (=ID1) can no longer be neglected when the voltage difference ΔV is significant. With the rectifier control system according to a thirteenth embodiment of the present invention, it is contemplated to overcome this problem. FIG. 24 is a schematic diagram showing a circuit configuration of the rectifier control system according to the instant embodiment of the invention. As can be seen in FIG. 24, the unbalance is suppressed by resorting to the command value generating circuit 14a, 24a described hereinbefore in conjunction with the first embodiment of the invention (FIG. 2). Incidentally, the gain of the coefficient unit 103 of the command value generating circuit 14a and that of the coefficient unit 301 of the α-command correcting circuit are each "R".

Figure 25:
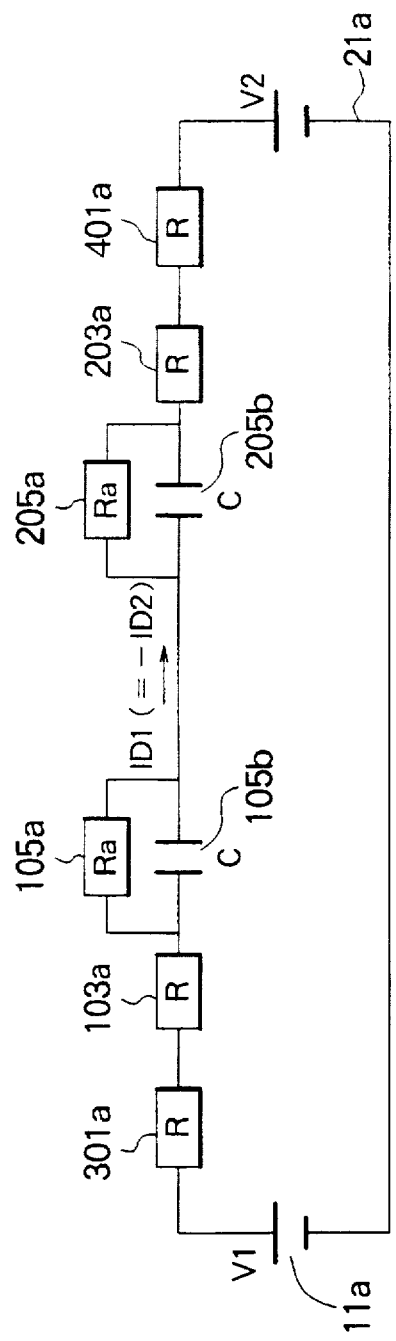
FIG. 25 is an equivalent circuit diagram for illustrating the principle of parallel operation of rectifiers according to the thirteenth embodiment of the invention.
Figure 26:
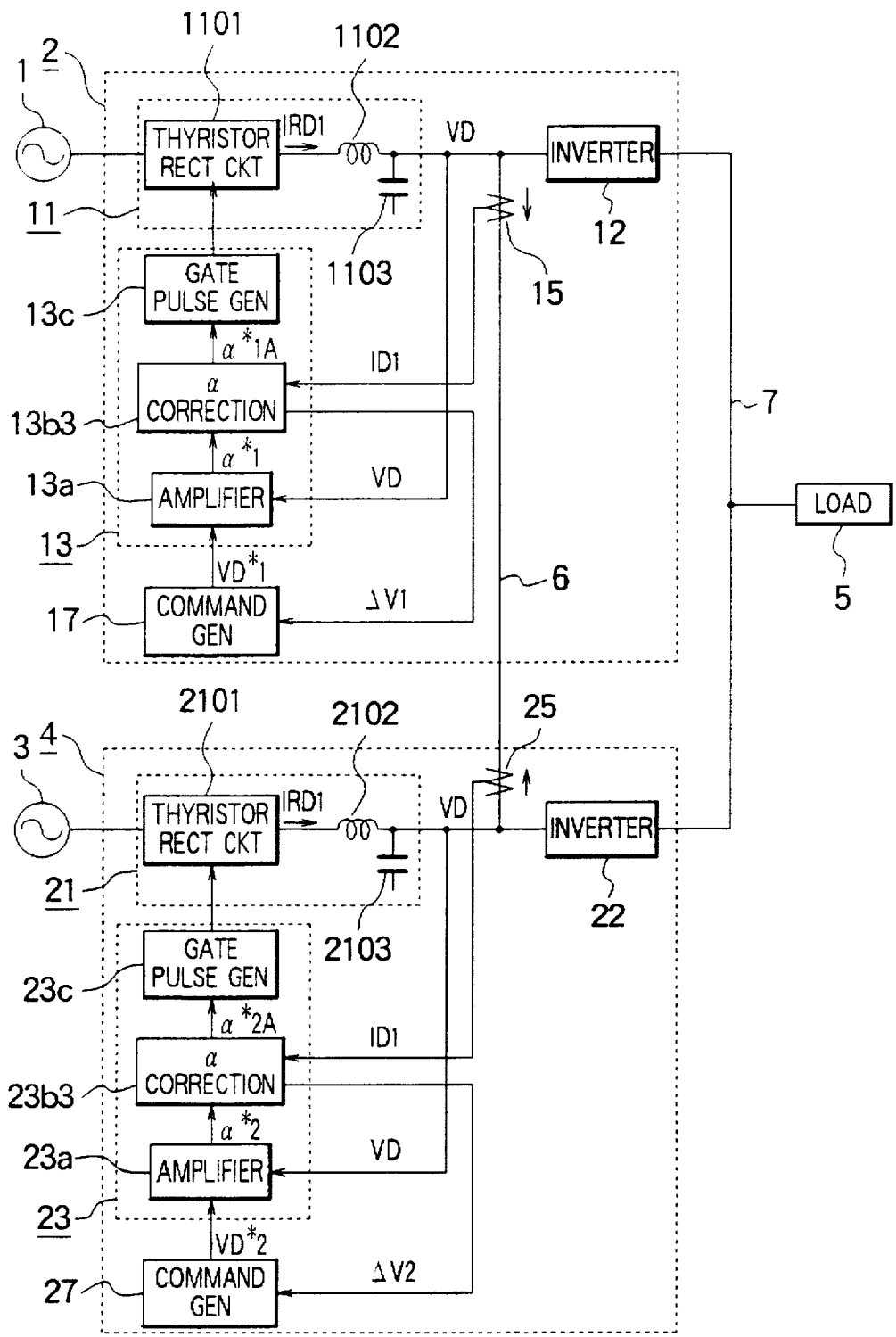
FIG. 26 is a circuit diagram showing a configuration of a rectifier control system according to a fourteenth embodiment of the present invention.

FIG. 25 is an equivalent circuit diagram for illustrating the principle underlying the parallel operation of the thyristor rectifier circuits 11 and 21 in the rectifier control system according to the thirteenth embodiment of the invention. A voltage supply source ha generates a DC voltage V1 corresponding to a DC output voltage generated by the thyristor rectifier circuit 11 when it operates solely or independently. Similarly, a voltage supply source 21a generates a DC voltage V2 which corresponds to a DC output voltage generated by the thyristor rectifier circuit 21 when it is operated solely. In this conjunction, let's assume that the direct voltage sources 11a and 21a are connected in common at respective negative poles. In this case, there are connected in series between the positive poles of the direct voltage sources 11a and 21a virtual resistors 301a and 401a each having a resistance value R and simulating operations of the α-command correcting circuits 13b2 and 23b2, respectively, virtual resistors 103a and 203a each having a resistance value R and simulating operations of coefficient units equivalent to the coefficient unit 103 of the command value generating circuit 14a and the coefficient unit 103 of the command value generating circuit 24a, respectively, a virtual capacitor 105b having a capacitance value C and connected in parallel to a virtual resistor 105a having the resistance value R and a virtual capacitor 205b having a capacitance value C and connected in parallel to the virtual resistance 205a of the resistance value "R".

The virtual resistor 105a and the virtual capacitor 105b are to simulate operation of the amplifier 105 having the first order lag characteristic (refer to FIG. 2). On the other hand, the virtual resistor 205a and the virtual capacitor 205b are to simulate operation of the amplifier 23a, (see FIG. 24) of the control circuit for the thyristor rectifier circuit 21.

When the thyristor rectifier circuits 11 and 21 are operated in parallel in the state where a voltage difference ΔV (=V1−V2) makes appearance between the direct voltage sources 11a and 21a, operation of the α-command correcting circuit 13b, 23b is triggered at first, whereby the bus current ID1 flowing through the DC bus 6 in the parallel operation is limited to a value given by the bus current ID1 which is determined by the ratio ΔV/2R by means of the virtual resistor 301a, 401a.

Because the virtual resistor 301a, 401a is effective as a disturbance to the voltage control system in a feed-forward fashion, they are put into operation as resistors at a high speed before the virtual resistor 103a, 203a representing equivalently the command value generating circuit 16, 26, becomes active. In succession, operation of the virtual resistor 301a, 401a representative of disturbance is suppressed by means of the amplifier 13a, 23a which operates to make the voltage command value VD* coincide with the voltage feedback VD. However, because the voltage command value VD* is corrected in proportion to the bus current flowing through the DC bus 6 by means of the virtual resistor 103a, 203a, operation of the virtual resistor 301a, 401a of the α-command correcting circuit 13b, 23b can smoothly be changed over to operation of the virtual resistor 103a, 203a of the α-command correcting circuit 13b, 23b.

Furthermore, the command value generating circuit 14a for the thyristor rectifier circuit 11 supplies to the current detector 15 a corrected voltage command value VD*1 (=VD*−G1(s)×ID1−R×ID1) by subtracting by the adder-subtractor 104 the amplified signal outputted from the amplifier 105 which amplifies the ID1 with the first-order lag characteristic G1(s).

The command value generating circuit 24a incorporated in the thyristor rectifier 21 is implemented in a structure similar to that of the command value generating circuit 14a. Thus, the voltage command value VD* for the thyristor rectifier 11, 12 is corrected with a signal obtained by amplifying proportionally the current flowing through the DC bus 6 with the first-order lag characteristic. The output voltage is controlled by the voltage control circuits 13 and 22 to which the corrected voltage command value voltage command value VD*1 is inputted.

Thus, even when a harmonic component(s) is contained in the output power of the AC power source 1, 2, mentioned previously in conjunction with the rectifier control apparatus, it is possible to droop stably the output voltage of the thyristor rectifier main circuitry 1101, 2101 by a decrement ΔV1 (=ID1×R) through simplified arithmetic processing, whereby the unbalances in the output voltage and the output current between the thyristor rectifiers 11 and 21 can be canceled out. Besides, transition to the mode in which the unbalance is suppressed stably and steadily can be effected smoothly.

Embodiment 14

In the rectifier control apparatus according to the thirteenth embodiment of the invention, the output voltage droop command ΔV1 of the α-command correcting circuit 13b and 23b is calculated independent from the command value droop determined by the command value generating circuits 16 and 26. With the instant embodiment of the invention, it is contemplated to implement the α-command correcting circuit 13b3 in a structure shown in FIG. 27 while implementing the command value generating circuit 17 in such an arrangement as shown in FIG. 28 for thereby allowing the output voltage droop command ΔV1 to be used as the commanded droop quantity. By virtue of such arrangement, the arithmetic parts can be realized in an integrated unit, which is advantageous in that the DC voltage can droop in a same manner transiently or steady relative to the bus current flowing through the DC bus 6.

Figure 27:
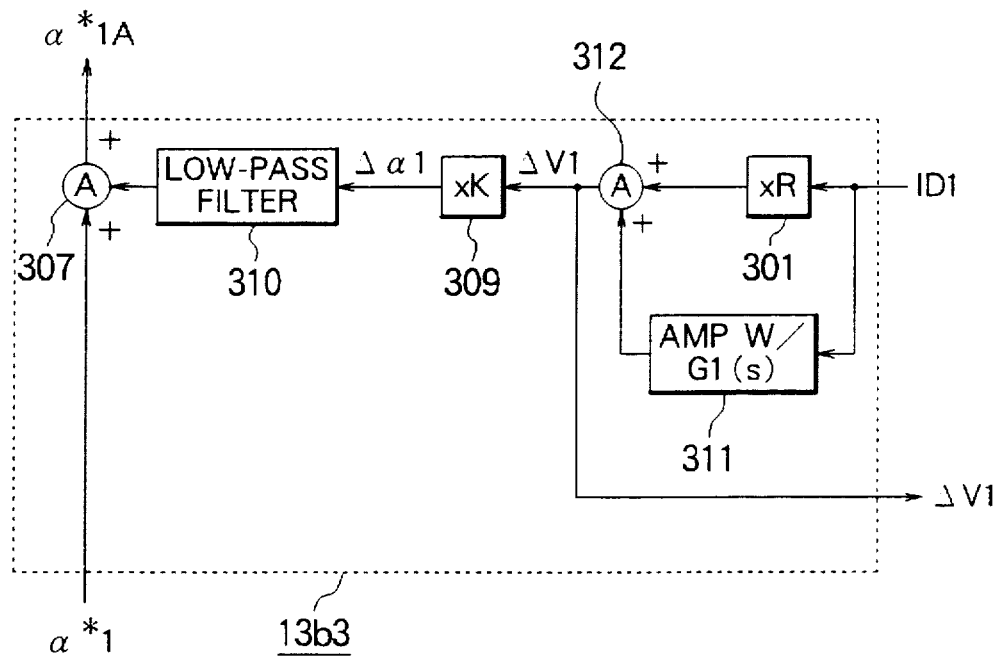
FIG. 27 is a block diagram showing a circuit configuration of an α-command correcting circuit according to the fourteenth embodiment of the invention.
Figure 28:
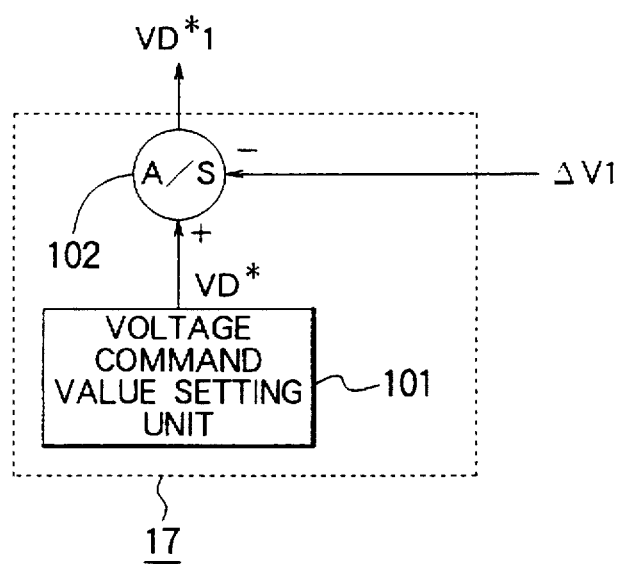
FIG. 28 is a block diagram showing a circuit configuration of a command value generating circuit according to the fourteenth embodiment of the invention.

Now referring to FIG. 27, a coefficient unit 301 and an amplifier 311 exhibiting a first order lag characteristic serve for respective functions which correspond to those of the coefficient unit 103 and the amplifier 105 of the command value generating circuit 14a, respectively, which have been described hereinbefore in conjunction with the thirteenth embodiment. The outputs of the coefficient unit 301 and the amplifier 311 having the first order lag characteristic are added to the bus current ID1 multiplied by "R" by means of an adder 312, whereby an increment Δα1 of the phase-control angle command value α*1 is determined by multiplying the signal ΔV1 by "K" by means of a coefficient unit 309. Subsequently, the increment Δα1 is inputted to the adder 307 by way of the low-pass filter 310 to be added with the phase-control angle command value α*1, whereby a corrected phase-angle control value α*1A is determined. The phase-control angle command value α*1A undergone the correction is outputted to the gate pulse generator 13c designed to output the firing pulses to the gate electrodes of the thyristors. Furthermore, as shown in FIG. 28, in the command value generating circuit 17, the increment signal ΔV1 determined by the α-command correcting circuit 13b3 is subtracted from the output VD* of the voltage command value setting unit 101 by means of the adder-subtractor 102, wherein the output of the adder-subtractor 102 is supplied to the amplifier 13a as the voltage command VD*1. Incidentally, an α-command correcting circuit 23b3 for the thyristor rectifier circuit 21 and the command value generating circuit 27 are realized in structures similar to those of the α-command correcting circuit 13b3 and the command value generating circuit 17. Thus, even when a harmonic component or components are contained in the AC power source 1, as described previously in conjunction with the twelfth embodiment, the output voltages of the thyristor rectifier main circuitry 1101 and 2101, respectively, can stably be drooped by a voltage decrement V1 (=ID1×R), whereby the unbalances in the output voltage and the output current between the thyristor rectifiers 11 and 21 can be canceled out through simplified arithmetic operation at a higher speed than the response speed of the voltage control system. Besides, by virtue of such arrangement that the output voltage droop command value and the commanded droop magnitude are determined on the basis of the result of the single arithmetic operation, the arithmetic parts can be realized in an integrated structure, whereby the unbalance can be suppressed smoothly even when it is of transient or steady nature.

Embodiment 15

In the rectifier control systems according to the tenth to fourteenth embodiments of the invention, the thyristor rectifier circuits 11 and 21 are employed only for the purpose of voltage control. By contrast, it is contemplated with the rectifier control system according to a fifteenth embodiment of the invention, to mitigate or eliminate at a high speed the voltage/current unbalanced state in the case where the thyristor rectifier circuits 11 and 21 are equipped with respective current minor loops for controlling currents flowing through reactors 1102 and 2102, respectively, as a voltage control minor loop.

Figure 29:
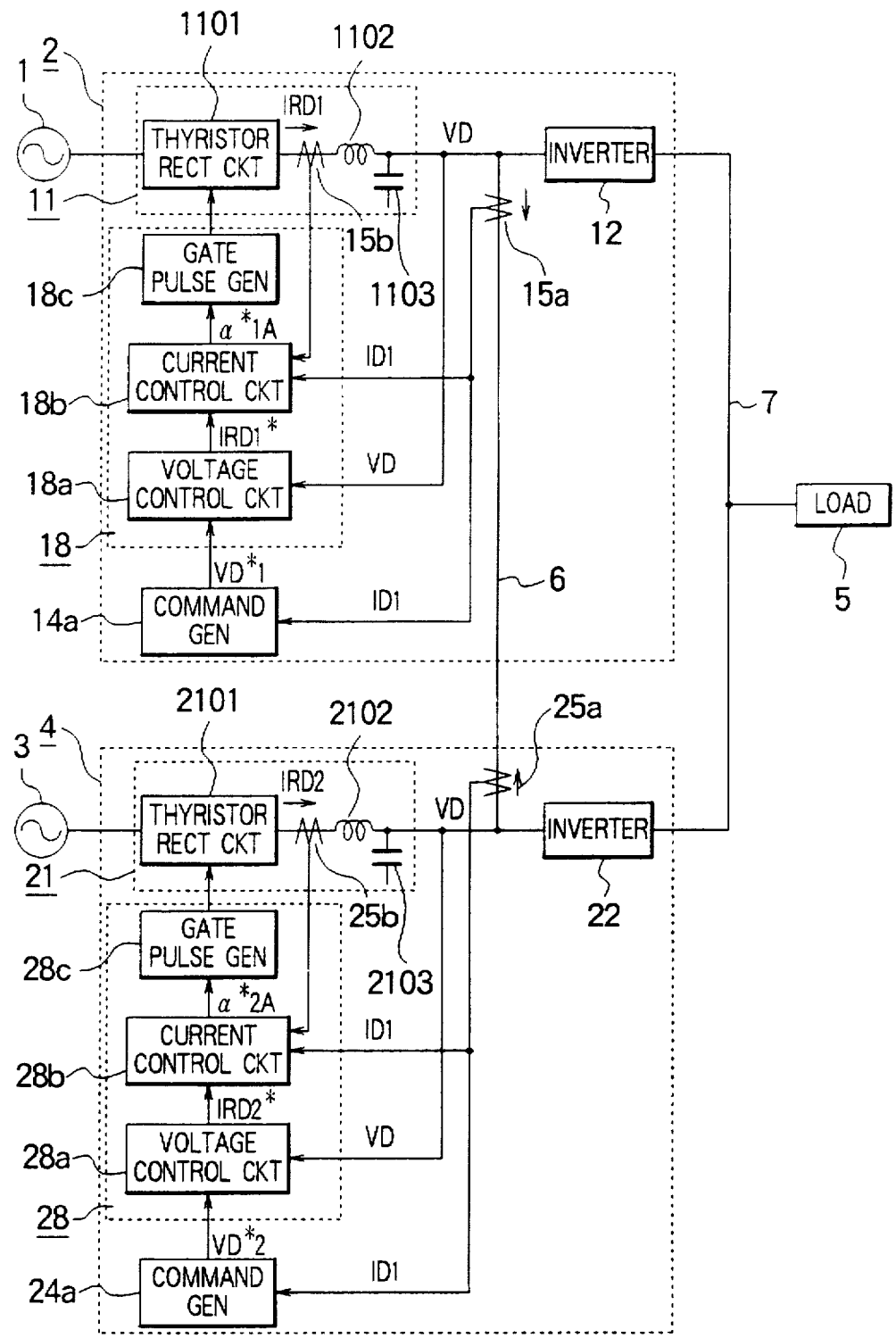
FIG. 29 is a block circuit diagram showing an arrangement of a rectifier control system according to a fifteenth embodiment of the present invention.

FIG. 29 is a block circuit diagram showing an arrangement of the rectifier control system according to a fifteenth embodiment of the invention, in which reference numerals 1 to 15 and 21 to 25 designate circuit components which are identical with or equivalent to those described hereinbefore in conjunction with the first to fourteenth embodiments. Accordingly, repeated description of these components will be unnecessary. The voltage controller 18 incorporated in the power converter 2 is comprised of a voltage control circuit 18a for determining an error or difference between the voltage command value VD*1 undergone the correction and a voltage feedback VD for amplifying the difference to thereby output a current command value IRD1 for a reactor 1102, a current control circuit 18b for correcting the current command value IRD1* so as to suppress a current flowing through the DC bus 6 and outputting a phase-control angle α*1A at which the corrected current command value IRDI* coincides with the current feedback IRDI, and a gate pulse generator (GPG) 18c for outputting the phase-control angle pulse signal α*1A for firing or triggering the gate of each of the thyristors. On the other hand, a voltage controller 28 incorporated in the power converter 4 is comprised of a voltage control circuit 28a, a current control circuit 28b and a gate pulse generator 28c similarly to the voltage controller 18.

Figure 30:
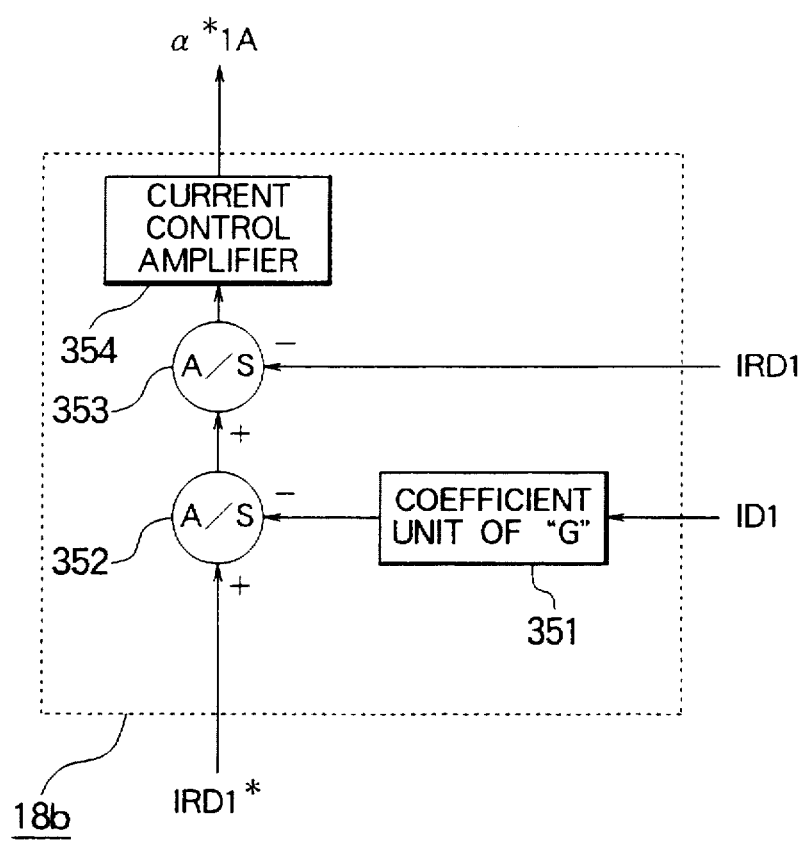
FIG. 30 is a block diagram showing a circuit configuration of a current control circuit according to the fifteenth embodiment of the invention.

FIG. 30 shows a circuit configuration of the current control circuit 18b. Referring to the figure, the current ID1 flowing through the DC bus 6 is multiplied by a coefficient or factor "G" by means of a coefficient unit 351, whereon the current ID1 multiplied by "G" is subtracted from the current command value IRD1* by means of an adder-subtractor 352 to thereby obtain a current command value for suppressing the current ID1. Subsequently, by means of an adder-subtractor 353, an error is arithmetically determined by subtracting the current feedback IRD1 from the current command value IRD1* outputted from the adder-subtractor 352 in order to make the current feedback IRD1 coincide with the above-mentioned current command value. More specifically, a current control amplifier 354 is operated in accordance with the error to make the current command value IRD1* coincide with the current feedback IRD1 for thereby outputting a phase-control angle α*1A. It goes without saying that the current control circuit 28b incorporated in the power converter 4 is implemented in a structure similar to that of the current control circuit 18b.

Furthermore, in the voltage control circuit 18a, 28a a voltage command value VD* is corrected by the command value generating circuit 14a, 24a so that the current ID1 is steadily suppressed. Thus, unbalance of the output voltage as well as that of the output current between the rectifiers can be canceled due to the operation of the current minor loop which responds at higher speed than the voltage control system. Besides, because the voltage command value VD* of the thyristor rectifier circuits 11 and 21 is corrected by the signal which has been amplified by the amplifier having the first order lag characteristic in proportion to the current flowing though the DC bus 6, while the output voltage is controlled by the voltage control circuit 13, 23, the unbalance can further be suppressed stably and steadily.

Embodiment 16

In the rectifier control systems according to the fifteenth embodiment of the invention, voltage control with a minor loop is adopted. By contrast, a rectifier control system according to a sixteenth embodiment of the present invention includes a voltage control minor loop controlling a voltage VTH1, VTH2 between a thyristor rectifier main circuitry 1101, 2101 and a reactor 1102, 2102, to thereby mitigate or eliminate at a high speed the voltage/current unbalanced state.

Figure 31:
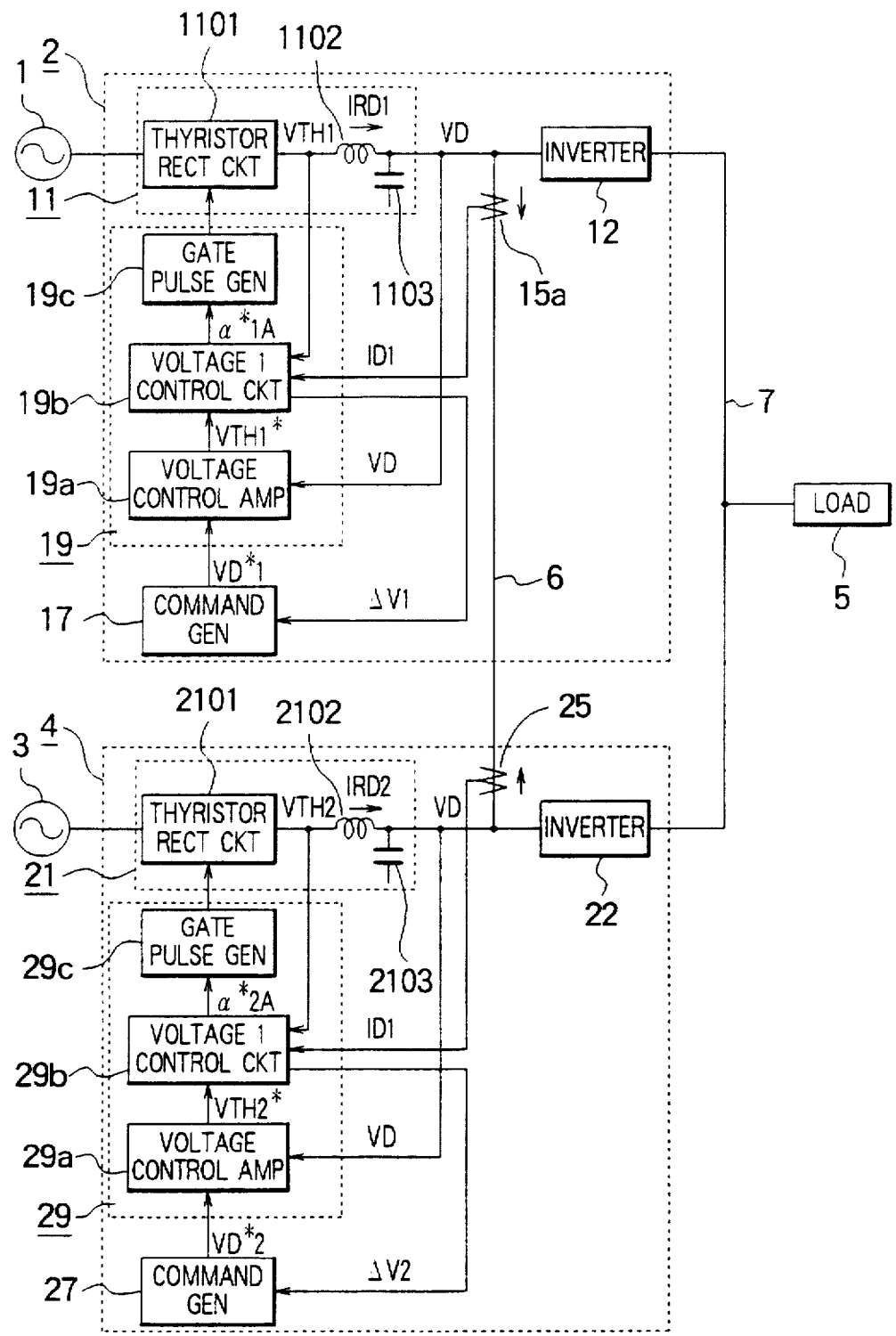
FIG. 31 is a circuit diagram showing a configuration of a rectifier control system according to a sixteenth embodiment of the present invention.

FIG. 31 is a block circuit diagram showing an arrangement of the rectifier control system according to a sixteenth embodiment of the invention, in which reference numerals 1 to 17 and 21 to 27 designate circuit components which are identical with or equivalent to those described hereinbefore in conjunction with the first to fifteenth embodiments. Accordingly, repeated description of these components will be unnecessary. The voltage controller 19 incorporated in the power converter 2 according to the instant embodiment is comprised of an amplifier or voltage control circuit 19a for determining an error or difference between the voltage command value VD*1 and a voltage feedback VD for amplifying the difference to thereby output a voltage command value VTH1* for the voltage VTH1 appearing between a thyristor rectifier main circuit 1101 and the reactor 1102, a voltage control circuit 19b for correcting the voltage command value VTH1* so as to suppress a current ID flowing through the DC bus 6 and outputting a phase-control angle α*1A at which the corrected voltage command value VTH1* coincides with the voltage feedback VTH1, and a gate pulse generator (GPG) 19c for outputting the phase-control angle pulse signal α*1A for firing or triggering the gate of each of the thyristors. On the other hand, a voltage controller 29 incorporated in the power converter 4 is comprised of an amplifier or voltage control circuit 29a, a voltage control circuit 29b and a gate pulse generator (GPG) 29c similarly to the voltage controller 19.

Figure 32:
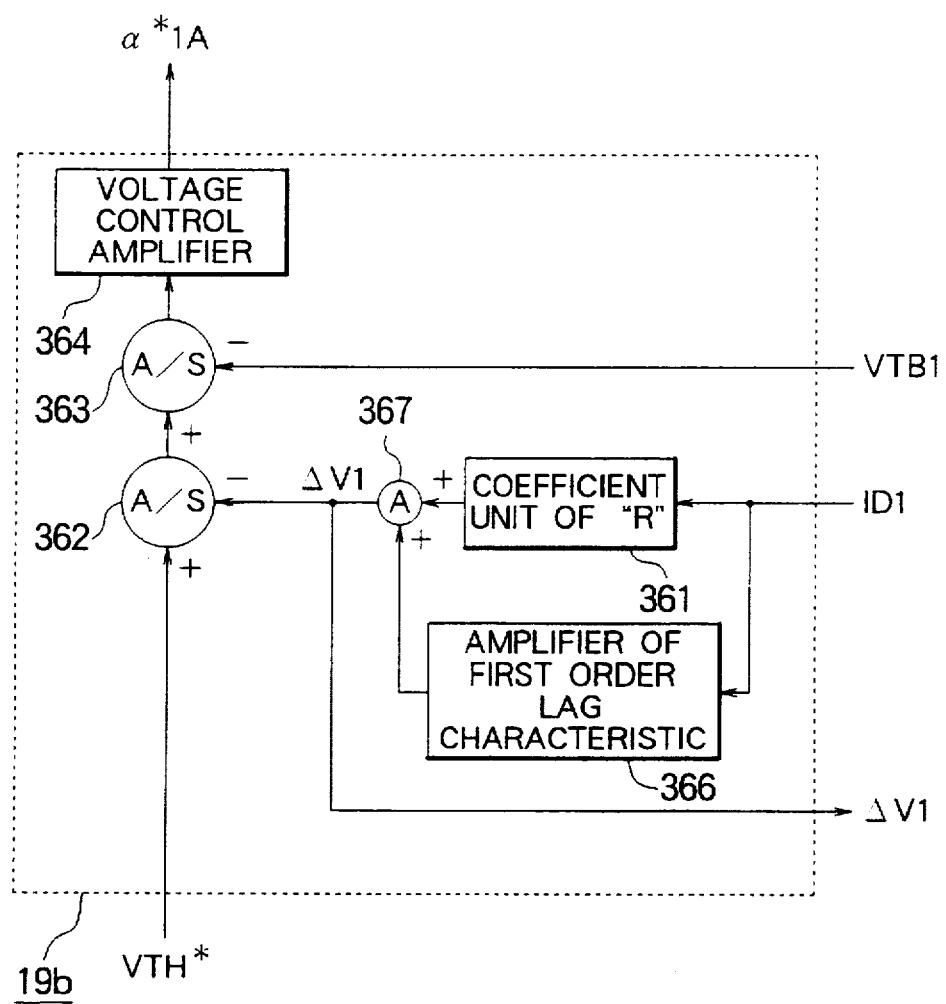
FIG. 32 is a block diagram showing a circuit configuration of a voltage control circuit according to the sixteenth embodiment of the invention.

FIG. 32 shows a circuit configuration of the voltage control circuit 19b. Referring to the figure, a coefficient unit 361 and an amplifier 366 of first order lag characteristic serve for functions corresponding to those of the coefficient unit 103 and the limiter circuit 106 or 107 in the command value generating circuit 14a according to the thirteenth embodiment of the invention. A signal ΔV1 obtained through addition of the outputs of the coefficient unit 361 and the amplifier 366 of first order lag characteristic represents a voltage droop command value for the voltage VTH1 or a commanded droop, to say in another way. The signal ΔV1 is subtracted from the voltage command value VTH1* by means of an adder-subtractor 362 to thereby obtain a voltage command value for suppressing the current ID1. Subsequently, by means of an adder-subtractor 363, an error is arithmetically determined by subtracting the voltage feedback VTH1 from the voltage command value VTH1* outputted from the adder-subtractor 362 in order to make the voltage feedback VTH1 coincide with the above-mentioned voltage command value. More specifically, a voltage control amplifier 364 is operated in accordance with the error to make the voltage command value VTH1* coincide with the voltage feedback VTH1 for thereby outputting a phase-control angle pulse signal α*1A to the gate pulse generator (GPG) 19c. It goes without saying that the voltage control circuit 28b incorporated in the power converter 4 is implemented in a structure similar to that of the voltage control circuit 19b.

Further, the signal ΔV1 determined by the voltage control circuit 19b is subtracted from the output VD* of the voltage command value setting unit 101 by means of the adder-subtractor 102 of the command value generating circuit 17, whereby a voltage command value VD*1 is supplied to the amplifier 19a. The command value generating circuit 27 of the thyristor rectifier circuit 21 is implemented in a same structure as the command value generating circuit 17. Thus, unbalance of the output voltage and the output current of the thyristor rectifier circuit 21 can be canceled out by the voltage minor loop at a higher response speed than the voltage control system. Besides, because the output voltage drop command value and the commanded droop can be determined on the basis of the result of the single arithmetic operation, the arithmetic parts can be realized in the form of an integrated structure. Thus, the unbalance can smoothly be suppressed not only in the transient state but also in the steady operation state.

At this juncture, it should be mentioned that the concepts underlying the command value generating circuit 14e and 14f described hereinbefore in conjunction with the fifth and sixth embodiments, respectively, may be so combined that the integration control is performed with both polarities by using two integrating amplifiers 108 together with the limiter circuit 107 of positive polarity and the limiter circuit 106 of negative polarity to thereby allow the voltage command value to droop or rise up.

Further, it should be mentioned that the concepts underlying the command value generating circuit 14g and 14f described hereinbefore in conjunction with the seventh and sixth embodiments, respectively, may be combined so that the integration control is performed with both polarities by using the integrating amplifier 108 and the proportional integrating amplifier 112 together with the limiter circuit 107 of positive polarity and the limiter circuit 106 of negative polarity to thereby allow the voltage command value to droop or rise up.

In addition, the concept underlying the voltage command value generation for disposing of a fault of the current detector described previously in conjunction with the eighth and ninth embodiments can equally be applied to the rectifier control systems according to the second, third, fourth and fifth embodiments.

Furthermore, the low-pass filter 310 described in conjunction with the twelfth embodiment may equally be applied to the rectifier control system according to the tenth embodiment of the invention.

Besides, the command value generating circuits 14a and 24a described previously in conjunction with the thirteenth embodiment may be employed in the command value generating circuits 14b to 14i of the second to ninth embodiments, respectively. On the other hand, the command value generating circuits 14a and 24a can be applied to the systems of the tenth and eleventh embodiments, respectively.

Although the α-command correcting circuit 13b3, 23b3 of the fourteenth embodiment is implemented by making use of the command value generating circuits 14a, 24a, the former can equally be realized by adopting the arrangement of the command value generating circuit 14b, . . . . 14i. Of course, the α-command correcting circuit 13b3, 23b3 can be employed in the rectifier control system according to the tenth and eleventh embodiments.

The command value generating circuit 14b, . . . , 14i of the second to ninth embodiments may be employed as the command value generating circuits 14a, 24a in the rectifier control system according to the fifteenth embodiment.

Additionally, although the voltage control circuit 19b, 29b of the sixteenth embodiment is realized by adopting the structure of the command value generating circuits 14a, 24a, the former may also be realized by adopting the structure of the command value generating circuit 14b, . . . . 14i described in conjunction with the second to ninth embodiments.

Many modifications and variations of the present invention are possible in the light of the above techniques. It is therefore to be understood that within the scope of the appended claims, the invention may be practiced otherwise than as specifically described.

What is claimed is:

1. A rectifier control system comprising:

a plurality of rectifiers connected in parallel for applying a DC voltage to a single direct current bus;

a plurality of current detectors, each of said current detectors being coupled with a respective one of said rectifiers for detecting a bus current flowing through the direct current bus;

a plurality of voltage control circuits, each of said voltage control circuits being coupled with a respective one of said rectifiers for controlling the DC voltage to coincide with a voltage command value; and a plurality of command value generating circuits, each including an amplifier having a first-order lag characteristic, each of said command value generating circuits being coupled with a respective one of said rectifiers for correcting the voltage command value using a signal indicative of the bus current and amplified by a respective one of said amplifiers having a first-order lag characteristic.

2. The rectifier control system according to claim 1, wherein each of said command value generating circuits includes a limiter circuit for passing a positive polarity output from said amplifier and limiting a negative polarity output from said amplifier to zero.

3. The rectifier control system according to claim 1, wherein each of said command value generating circuits includes a limiter circuit for passing a negative polarity output from said amplifier and limiting a positive polarity output from said amplifier to zero.

4. The rectifier control system according to claim 1, wherein each of said command value generating circuits includes:

a dead zone circuit for suppressing influence of an offset of the bus current; and an integrating amplifier for integrating and amplifying a signal output by said dead zone circuit, to correct the voltage command value.

5. The rectifier control system according to claim 4, wherein each of said command value generating circuits includes a limiter circuit for passing a negative polarity component of the signal output from said integrating amplifier and limiting to zero a positive polarity component of the signal output from said integrating amplifier.

6. The rectifier control system according to claim 1, wherein at least one of said command value generating circuits includes a lower limit value restricting circuit for setting one of a permissible value of DC voltage for the voltage command value and a permissible value for a signal for correcting the voltage command value.

7. The rectifier control system according to claim 1, wherein at least one of said command value generating circuits includes an upper limit value restricting circuit for setting one of a permissible value of DC voltage for said voltage command value and a permissible value for a signal for correcting said voltage command value.

8. A rectifier control system comprising:

a plurality of rectifiers connected in parallel for applying a DC voltage to a single direct current bus;

a plurality of current detectors, each of said current detectors being coupled with a respective one of said rectifiers for detecting a bus current flowing through the direct current bus;

a plurality of voltage control circuits, each of said voltage control circuits being coupled with a respective one of said rectifiers for controlling the DC voltage to coincide with a voltage command value; and a command value generating circuit for correcting the voltage command value, said command value generating circuit including:

a voltage command value setting unit for generating the voltage command value, a current command value setting unit for generating a current command value, means for determining a difference between the current command value and the bus current, and means for integrating a signal proportional to the difference between the bus current and the current command value.

9. The rectifier control system according to claim 8, wherein said command value generating circuit includes a limiter circuit for passing a negative polarity component of the signal integrated by said means for integrating and limiting to zero a positive polarity component of the signal integrated by said means for integrating.

10. The rectifier control system according to claim 8, including a multiplier for multiplying a signal proportional to a deviation between the bus current and the current command value by a coefficient and an integrator for integrating the signal multiplied by the coefficient, wherein said command value generating circuit corrects the voltage command value with a proportionally integrated signal output by said integrator.

11. The rectifier control system according to claim 10, wherein said command value generating circuit includes a limiter circuit passing a negative polarity component of the proportionally integrated signal and limiting to zero a positive polarity component of the proportionally integrated signal.

12. A rectifier control system comprising:

a plurality of thyristor rectifier circuits connected in parallel for applying a DC voltage to a single direct current bus;

a plurality of current detectors, each of said current detectors being coupled with a respective one of said thyristor rectifier circuits for detecting a bus current flowing through the direct current bus;

a plurality of voltage control amplifiers, each of said voltage control amplifiers being coupled with a respective one of said thyristor rectifier circuits for outputting a phase-control angle signal for each of said rectifying circuits for making the DC voltage coincide with a voltage command value; and a plurality of α-command correcting circuits, each of said α-command correcting circuits being coupled with a respective one of said thyristor rectifier circuits for correcting the phase-control angle signal with a correcting quantity signal proportional to the bus current.

13. The rectifier control system according to claim 12, wherein each of said α-command correcting circuits determines a correcting quantity for the phase-control angle signal of each of said rectifying circuits on the basis of the bus current.

14. The rectifier control system according to claim 12, wherein each of said α-command correcting circuits determines a correcting quantity signal for correcting the phase-control angle signal of each of said rectifying circuits on the basis of an effective value of an AC power supply, a phase-control angle of each of said rectifying circuits, and the bus current.

15. The rectifier control system according to claim 12, wherein each of said α-command correcting circuits includes a low-pass filter for eliminating a harmonic component from the correcting quantity signal of the phase-control angle signal of each of said rectifying circuits.

16. The rectifier control system according to claim 12, comprising a plurality of command value generating circuits, wherein each of said command value generating circuits includes an amplifier having a first-order lag characteristic and corrects a voltage command value supplied to each of said voltage control amplifiers with a signal proportional to the bus current and a signal indicative of the bus current and amplified by a respective one of said amplifiers.

17. The rectifier control system according to claim 12, wherein at least one of said plurality of α-command correcting circuits includes an amplifier having a first-order lag characteristic and corrects the phase-control angle signal and the voltage command value with a signal indicative of the bus current and amplified by said amplifier.

18. A rectifier control system, comprising:

a plurality of thyristor rectifier circuits connected in parallel for applying a DC voltage to a single direct current bus;

a plurality of current detectors, each current detector being coupled with a respective one of said thyristor rectifier circuits for detecting a bus current flowing through the direct current bus;

a plurality of voltage control amplifiers, each voltage control amplifier being coupled with a respective one of said thyristor rectifier circuits for outputting a current command value signal making the DC voltage coincide with a voltage command value;

a plurality of current control amplifiers for making the current command value signal coincide with an output current of each of said thyristor rectifier circuits; and command value correcting means including an amplifier having a first-order lag characteristic and coupled to each of said thyristor rectifier circuits for correcting the voltage command value and the current command value signal with a signal obtained by amplifying the bus current in said amplifier.

19. A rectifier control system comprising:

a plurality of thyristor rectifier circuits connected in parallel for applying a DC voltage to a single direct current bus;

a plurality of current detectors, each of said current detectors being coupled with a respective one of said thyristor rectifier circuits for detecting a bus current flowing through the direct current bus;

a plurality of voltage control amplifiers, each of said voltage control amplifiers being coupled with a respective one of said thyristor rectifier circuits for outputting a thyristor rectifier main circuit output voltage command value for making the DC voltage coincide with a voltage command value;

a plurality of voltage control circuits, each of said voltage control circuits being coupled to a respective one of said thyristor rectifier circuits for making the thyristor rectifier main circuit output voltage command value coincide with a thyristor rectifier main circuit output voltage of each of said thyristor rectifier circuits; and command value correcting means including an amplifier having a first-order lag characteristic and coupled to each of said thyristor rectifier circuits for correcting a voltage command value, the thyristor rectifier main circuit output voltage command values and a current command value with a signal proportional to the bus current and a signal indicative of the bus current and amplified by said amplifier.

* * * * *

UNITED STATES PATENT AND TRADEMARK OFFICE
CERTIFICATE OF CORRECTION

PATENT NO. : 5,796,601
DATED : August 18, 1998
INVENTOR(S) : YUUSHIN YAMAMOTO

It is certified that error appears in the above-identified patent and that said Letters Patent is hereby corrected as shown below:

Column 32, Line 61, change "values" to --value,--.

Signed and Sealed this

Seventeenth Day of November, 1998

*Attest:*

BRUCE LEHMAN

*Attesting Officer*  *Commissioner of Patents and Trademarks*